United States Patent
Voges et al.

(10) Patent No.: US 12,550,927 B2
(45) Date of Patent: Feb. 17, 2026

(54) SYSTEMS, APPARATUSES, AND METHODS OF SUBSTANCE PROCESSING

(71) Applicant: Bellwether Coffee Co., Berkeley, CA (US)

(72) Inventors: Jens Peter Voges, Tiburon, CA (US); Fong Liu, San Francisco, CA (US); John Laird, Emeryville, CA (US); Scott Whitman, San Francisco, CA (US); Zachary Russell Heineman, Oakland, CA (US); Dylan Hilmer Bird, San Francisco, CA (US); Nicholas Scott Reimnitz, Los Gatos, CA (US); Pietro Valsecchi, San Francisco, CA (US)

(73) Assignee: Bellwether Coffee Co., Berkeley, CA (US)

( * ) Notice: Subject to any disclaimer, the term of this patent is extended or adjusted under 35 U.S.C. 154(b) by 0 days.

(21) Appl. No.: 18/490,102

(22) Filed: Oct. 19, 2023

(65) Prior Publication Data

US 2024/0298690 A1 Sep. 12, 2024

Related U.S. Application Data

(63) Continuation of application No. 16/434,818, filed on Jun. 7, 2019, now Pat. No. 11,839,230.

(Continued)

(51) Int. Cl.
*A23N 12/12* (2006.01)
*A23F 5/04* (2006.01)
(Continued)

(52) U.S. Cl.
CPC ............. *A23N 12/125* (2013.01); *A23F 5/04* (2013.01); *A23F 5/10* (2013.01); *A47J 31/42* (2013.01);
(Continued)

(58) Field of Classification Search
CPC .. A23F 5/10; A23F 5/04; A23N 12/125; A47J 31/42; A47J 37/0754; B05B 1/34; B65B 69/0041; B65B 69/005
(Continued)

(56) References Cited

U.S. PATENT DOCUMENTS

| 1,911,763 | A | | 5/1933 | Maede |
| 3,189,460 | A | * | 6/1965 | Smith, Jr. ............. A23N 12/08 99/476 |

(Continued)

FOREIGN PATENT DOCUMENTS

| GB | 2485073 A | 5/2012 |
| WO | WO-2013192569 A2 | 12/2013 |
| WO | WO-2018053436 A1 * | 3/2018 ............ A47J 31/521 |

OTHER PUBLICATIONS

International Search Report and Written Opinion for International Application No. PCT/US2017/052085, mailed Jan. 17, 2018, 25 pages.

(Continued)

*Primary Examiner* — Jimmy Chou
(74) *Attorney, Agent, or Firm* — COOLEY LLP

(57) ABSTRACT

A substance processing system includes a pressurizer configured to pressurize air and a processing chamber configured to process a substance. The system also includes a heat exchanger coupled between the pressurizer and the processing chamber. A nozzle is coupled to the processing chamber such that output from the nozzle comprises a substantially even pressure distribution.

20 Claims, 13 Drawing Sheets

Related U.S. Application Data

(60) Provisional application No. 62/682,675, filed on Jun. 8, 2018.

(51) Int. Cl.
| | | |
|---|---|---|
| *A23F 5/10* | (2006.01) | |
| *A47J 31/42* | (2006.01) | |
| *A47J 37/07* | (2006.01) | |
| *B05B 1/34* | (2006.01) | |
| *B65B 69/00* | (2006.01) | |

(52) U.S. Cl.
CPC ............ *A47J 37/0754* (2013.01); *B05B 1/34* (2013.01); *B65B 69/0041* (2013.01); *B65B 69/005* (2013.01)

(58) Field of Classification Search
USPC .......................................................... 99/447
See application file for complete search history.

(56) References Cited

U.S. PATENT DOCUMENTS

| | | | | |
|---|---|---|---|---|
| 3,328,172 | A * | 6/1967 | Smith, Jr. | ............. A23N 12/08 426/507 |
| 3,572,235 | A | 3/1971 | Nutting et al. | |
| 3,595,668 | A | 7/1971 | Nutting et al. | |
| 3,703,861 | A * | 11/1972 | Slack | ................. A23N 12/08 99/451 |
| 4,325,191 | A | 4/1982 | Kumagai et al. | |
| 4,360,970 | A | 11/1982 | Ostroski et al. | |
| 4,949,632 | A | 8/1990 | Camerini Porzi | |
| 5,205,274 | A * | 4/1993 | Smith | ................... F24C 15/08 432/142 |
| 5,547,373 | A * | 8/1996 | Snell | ......................... F23G 7/07 126/21 R |
| 5,609,097 | A | 3/1997 | Newnan | |
| 5,958,494 | A | 9/1999 | Tidland et al. | |
| 6,053,093 | A | 4/2000 | Gerhardt et al. | |
| 6,106,877 | A | 8/2000 | Allington et al. | |
| 6,759,072 | B1 | 7/2004 | Gutwein et al. | |
| 6,833,533 | B1 * | 12/2004 | Wolfe | .................... A21B 1/245 219/400 |
| 7,102,105 | B2 * | 9/2006 | Oh | ........................ F24C 15/325 219/400 |
| 7,348,522 | B1 * | 3/2008 | Criscuolo | ............. F25D 25/028 219/487 |
| 7,368,683 | B2 * | 5/2008 | Kim | ...................... F24C 15/325 219/400 |
| 7,368,684 | B2 * | 5/2008 | Kim | ...................... F24C 15/2007 219/400 |
| 7,455,867 | B1 | 11/2008 | Gutwein et al. | |
| 7,491,914 | B2 * | 2/2009 | Kim | ...................... F24C 15/325 219/400 |
| 7,534,978 | B2 * | 5/2009 | Diehm | ................... B23K 1/012 219/217 |
| 7,998,515 | B2 | 8/2011 | Weisberg et al. | |
| 8,011,293 | B2 * | 9/2011 | McFadden | ............... A21B 1/24 219/400 |
| 8,042,458 | B2 * | 10/2011 | Ueda | ....................... F24C 15/16 219/400 |
| 8,475,718 | B2 * | 7/2013 | Sifers | ........................ F23G 7/07 422/120 |
| 11,439,156 | B2 | 9/2022 | Voges et al. | |
| 11,839,230 | B2 | 12/2023 | Voges et al. | |
| 12,349,694 | B2 | 7/2025 | Voges et al. | |
| 2003/0180419 | A1 | 9/2003 | Calderone | |
| 2004/0000239 | A1 | 1/2004 | Munk | |
| 2004/0074400 | A1 * | 4/2004 | Song | ..................... A23N 12/10 99/483 |
| 2005/0139084 | A1 * | 6/2005 | Caswell | ................ G07F 13/065 99/286 |
| 2006/0108415 | A1 | 5/2006 | Thomas et al. | |
| 2006/0147590 | A1 | 7/2006 | Freedman | |
| 2006/0266229 | A1 | 11/2006 | Ribich | |
| 2008/0089986 | A1 | 4/2008 | Song | |
| 2008/0156816 | A1 | 7/2008 | Gelardi | |
| 2008/0206420 | A1 * | 8/2008 | McFadden | ................. A23L 5/17 219/385 |
| 2009/0130277 | A1 | 5/2009 | Bressner et al. | |
| 2009/0187086 | A1 | 7/2009 | Benaron et al. | |
| 2009/0304886 | A1 * | 12/2009 | Greenfield | ........... A23N 12/086 34/493 |
| 2009/0308831 | A1 | 12/2009 | Anderson | |
| 2011/0314728 | A1 * | 12/2011 | Camper | ................... C10L 5/442 44/608 |
| 2012/0265364 | A1 | 10/2012 | Zambrano | |
| 2013/0209638 | A1 | 8/2013 | Sewell et al. | |
| 2013/0276637 | A1 | 10/2013 | Stordy et al. | |
| 2013/0344207 | A1 | 12/2013 | Ludwig | |
| 2014/0314921 | A1 | 10/2014 | Kuempel et al. | |
| 2014/0314923 | A1 * | 10/2014 | Sewell | .................... A23N 12/08 426/233 |
| 2015/0082992 | A1 * | 3/2015 | Johnson | ................... A23L 7/187 99/323.5 |
| 2015/0366234 | A1 | 12/2015 | Kuempel et al. | |
| 2016/0016181 | A1 | 1/2016 | Lathrop et al. | |
| 2016/0055599 | A1 | 2/2016 | Illy et al. | |
| 2016/0120211 | A1 | 5/2016 | Wilson et al. | |
| 2016/0174590 | A1 * | 6/2016 | Boggavarapu | ...... A47J 31/4492 426/433 |
| 2016/0183586 | A1 * | 6/2016 | Min | ........................ A23N 12/10 99/324 |
| 2016/0212831 | A1 | 7/2016 | Dobai et al. | |
| 2016/0219924 | A1 | 8/2016 | Krutin | |
| 2016/0295906 | A1 * | 10/2016 | Jacobsen | .................... A23L 5/34 |
| 2016/0338376 | A1 | 11/2016 | Kelly et al. | |
| 2016/0338525 | A1 | 11/2016 | Fain | |
| 2017/0318854 | A1 | 11/2017 | Tan et al. | |
| 2018/0000108 | A1 * | 1/2018 | Boggavarapu | ...... A47J 31/5251 |
| 2018/0008088 | A1 | 1/2018 | Alshammary | |
| 2018/0271322 | A1 | 9/2018 | Thai et al. | |
| 2018/0360064 | A1 | 12/2018 | Elsby et al. | |
| 2019/0166899 | A1 | 6/2019 | Perentes et al. | |
| 2019/0208798 | A1 | 7/2019 | Voges et al. | |
| 2019/0254468 | A1 | 8/2019 | Vaaranmaa | |
| 2019/0373940 | A1 | 12/2019 | Voges et al. | |
| 2023/0165267 | A1 | 6/2023 | Voges et al. | |
| 2023/0320404 | A1 | 10/2023 | Disler | |

OTHER PUBLICATIONS

Office Action for U.S. Appl. No. 16/334,169, mailed Jun. 4, 2020, 10 pages.

\* cited by examiner

SYSTEMS, APPARATUSES, AND METHODS OF SUBSTANCE PROCESSING

CROSS-REFERENCE TO RELATED APPLICATIONS

This application is a continuation of U.S. patent application Ser. No. 16/434,818, filed Jun. 7, 2019, entitled "SYSTEMS, APPARATUSES, AND METHODS OF SUBSTANCE PROCESSING," (now U.S. Pat. No. 11,839,230), which claims priority benefit, under 35 U.S.C. § 119 (e), to U.S. Provisional Application No. 62/682,675, filed Jun. 8, 2018, and entitled "SYSTEMS, APPARATUSES, AND METHODS OF SUBSTANCE PROCESSING," which are hereby incorporated herein by reference in their entirety.

BACKGROUND

Every year more than 3.5 billion pounds of unroasted coffee beans are imported into the U.S. to be roasted and consumed by 60% of the U.S. population. Over a million businesses in the U.S. serve coffee each year but only a few thousand businesses are able to roast their own coffee given inherent complexities to the process and operating existing equipment. Roasting coffee on-site (i.e., roasting the coffee where the coffee beverages are prepared and served) can improve the coffee freshness, reduce the inventory loss rates due to shelf life (unroasted coffee beans usually have a much longer shelf life), and increase profitability.

Currently, roasting of coffee beans is typically carried out at centralized locations due to the space, cost, and expertise required. Existing coffee roasting equipment is typically large and expensive, requiring manual operation by skilled "roast masters." The roast master controls variables in coffee roasting, including but not limited to airflow through the roasting drum, tumbling speed of the roasting drum, and heat application to name a few variables. The roast master manually manipulates these variables in real-time on the equipment to control the "roast profile" of the coffee beans. However, these variables and the resulting roast profile are usually unknown to other people, including purchasers and retailers. As a result, only a limited number of people have access to the equipment and the roasting expertise.

Moreover, coffee is freshest within 10-14 days after roasting, which applies downward pressure on the coffee supply chain. In contrast, the shelf life of unroasted coffee is typically on the order of about 1 year from the time of milling processing at origin. Manufacturers currently use various gases and other means to preserve roasted whole bean and ground coffee, which is packaged to improve the shelf life after roasting. However, this processing can impact the taste and quality of the end product.

"Third wave" specialty coffee producers may address the desire for fresh coffee of consumers by using high quality coffee beans and reducing the time between roasting and sale. Over the last five years, "third wave" specialty coffee producers have raised significant capital and invested in brick and mortar infrastructure, including high cost roasting equipment. They also hire personnel with the required expertise to source and roast specialty coffee, taking the first steps towards decentralizing coffee roasting from large plants. However, these businesses normally are only able to cater to retailers within a certain geographic radius of their infrastructure. As an example, Blue Bottle Coffee, which is perhaps the most recognized third wave coffee supplier in the U.S., announced in 2016 that it was exiting its wholesale business due to issues with cost, quality, and supply chain.

Unroasted coffee is roughly one-seventh the price of roasted coffee whether it be for first, second, or third-wave coffees. By way of example, third wave coffee roasters typically pay $3-$4 per pound for green unroasted coffee beans and then sell for $21 to $28 per pound at retail. Coffee retailers sourcing wholesale third-wave coffee for serving or selling pay an average of $10-$14 for roasted specialty coffee beans. There is significant inefficiency in the coffee market and supply chain, as well as limited profitability for coffee retailers due to all of the above factors.

SUMMARY

Embodiments disclosed herein include apparatus, systems, and methods for substance processing. In some embodiments, an apparatus includes a receptacle configured to receive a container containing a substance for processing. The container includes a readable tag having processing information associated with the substance. The apparatus also includes a processing chamber operably coupled to the receptacle and configured to receive the substance and process the substance. The apparatus further includes a controller operably coupled to the processing chamber and configured to generate one or more processing instructions based on the processing information in the readable tag and further based on additional processing information received from a remote device. The processing is also configured to process the substance based on the one or more processing instructions.

In some embodiments, a method includes receiving a container containing a substance for processing. The container includes a readable tag having processing information associated with the substance. The method also includes generating processing instructions, using a controller, based at least in part on the processing information read from the readable tag and additional processing information received from a remote device or contained locally on the substance processor. The method also includes dispensing the substance in the container into a processing chamber and processing the substance based at least in part on the processing instructions.

In some embodiments, a system includes a plurality of roasting devices and each roasting device includes a receptacle configured to receive a container. The container includes a substance for processing and the container further includes a tag having processing information. Each roasting device also includes a tag reader configured to read the processing information from the tag on the container and a processing chamber to process the substance. The system also includes a computing device, which includes a memory configured to store a plurality of roasting instructions. Each roasting instruction of the plurality of roasting instructions has corresponding processing information associated therewith. The computing device also includes a communication interface operably coupled to the memory and a processor operably coupled to the memory and the communication interface. The processor is configured to execute executable instructions to receive the processing information via the communication interface from at least one roasting device, retrieve the roasting instruction corresponding to the processing information from the memory, and control the communication interface to transmit that roasting instruction to the at least one roasting device.

In some embodiments, an apparatus associated with a master coffee roaster configured for roasting a sample of a green coffee and generating a plurality of roasting instructions, the plurality of roasting instructions usable by a plurality of user coffee roasters is disclosed. The apparatus includes memory to store a plurality of roasting instructions and each roasting instruction in the plurality of roasting instructions has corresponding identification information. The apparatus also includes a communication interface operably coupled to the memory and a processor operably coupled to the memory and the communication interface. The processor being configured to execute executable instructions to receive the identification information via the communication interface from at least one user coffee roaster, retrieve the roasting instruction corresponding to the identification information from the memory, and control the communication interface to transmit the roasting instruction to the at least one user roaster sending the identification information.

BRIEF DESCRIPTIONS OF DRAWINGS

FIG. 1 illustrates a schematic of a platform for on-site substance processing, according to embodiments.

FIG. 2 illustrates a method of integrated coffee roasting, according to embodiments.

FIG. 3 illustrates a schematic of a system for integrated coffee roasting according to embodiments.

FIG. 4 illustrates a schematic of a platform for users to roast coffee, according to embodiments.

FIGS. 5A and 5B are example interfaces for facilitating on-site coffee roasting, according to embodiments.

FIG. 6 illustrates a method of substance processing, according to embodiments.

FIG. 7 illustrates a block diagram of a distributed system for substance processing, according to embodiments.

FIGS. 8A-8D illustrate various views a compact coffee roaster, according to embodiments.

FIGS. 9A and 9B illustrate two cooling trays that can be used in the roaster shown in FIGS. 8A-8D, according to embodiments.

FIG. 14B illustrates another perspective view of the compact roaster depicted in FIG. 14A.

Figure 8D:
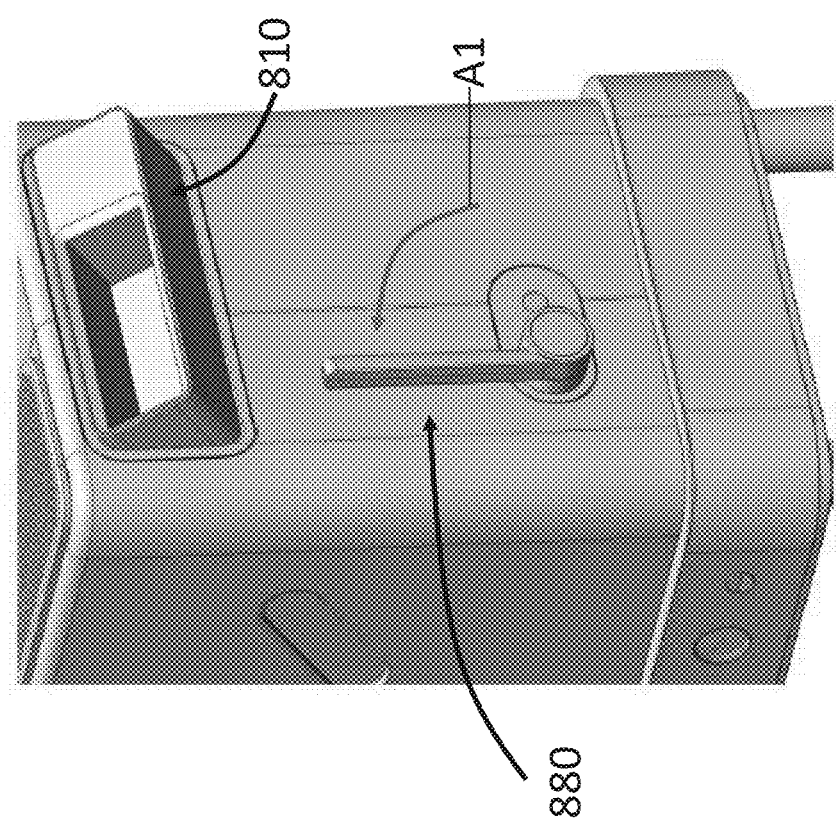

FIG. 15A illustrates a perspective view of a roasting chamber and nozzle, according to embodiments. FIG. 15B is a cross-sectional view of the nozzle depicted in FIG. 15A. FIG. 15C is a schematic cross-sectional view of the nozzle depicted in FIG. 15A.

FIG. 16 illustrates a plot of flow rate and pressure drop of a roaster, according to embodiments.

FIG. 17 illustrates a block diagram of a roaster system, according to embodiments.

FIGS. 18A-18G illustrate methods of opening a consumable, according to embodiments.

DETAILED DESCRIPTION

Systems, apparatus, and methods described herein are directed to an integrated substance processing platform for a user to process a substance on-site. For example, the platform can be used for on-site coffee roasting. In such instances, the user can include a business (e.g., a coffee shop, a grocery store), an individual customer who makes coffee at home, or anyone who is interested in roasting coffee.

FIG. 1 illustrates a platform 100 (sometimes also referred to as a network, an environment, or a system) for users to perform on-site substance processing. The platform 100 includes a processing apparatus 110, a consumable 120 (also sometimes referred to as a container 120) containing a substance to be processed, and a database 130 (also sometimes referred to as a server 130, including a server that encompasses or is associated with the database 130). In some instances, a user associated with the processing apparatus 110 operates the processing apparatus 110 to process the substances contained in the consumable 120, while another entity (sometimes also referred to as a service party), such as a wholesale distributor, provides the consumable 120 and maintains the database 130. The consumable 120 contains at least one unprocessed or partially processed substance and includes a tag 125 having processing information associated with that substance. The processing apparatus 110 includes a receptacle 140 to receive the consumable 120, a processing chamber 112 (also sometimes referred to as a substance processor) to process the substances, a controller 114 to control the operation of the processing apparatus 110, and an optional tag reader 115 to read the tag 125 included in the consumable 120.

In operation, and as described in greater detail herein, the user places the consumable 120 into the receptacle 140 of the processing apparatus 110. The tag reader 115 reads the tag 125 (e.g., via scanning, imaging, or other suitable techniques for acquiring information from the tag) and transmits the information in the tag 125 to the controller 114. The controller 114 then generates specific instructions to direct the processor 112 to process the substances in the consumable 120 based on the information contained in the tag 125 and also based on additional processing information received from the database 130. The specific instructions can be acquired directly or indirectly from the database 130, as described in more detail herein. Since the specific instructions can be provided by the third party and encoded through tag 125 on the consumable 120 which is ready for immediate use, the user can process the substance without developing any expertise about substance processing, thereby allowing a wide range of people to perform on-site substance processing.

In embodiments where the substance is unroasted green coffee beans (sometimes also referred to simply as "green coffee"), the processing chamber 112 in the processing apparatus 110 can be or include a roasting chamber; accordingly, the processing apparatus 110 is sometimes also referred to as a roasting system 110. In such embodiments, the processing chamber 112 can be configured to roast the substance via conductive heat application. In some embodiments, the processing chamber 112 can be configured to roast the substance via convective heat application. In some embodiments, the processing chamber 112 can be configured to roast the substance via a combination of conductive heat application and convective heat application. In some embodiments, the processing chamber 112 is configured to roast the substance via inductive heat application. In some embodiments, the processing chamber 112 can be configured to roast the substance via a combination of any of the above heating mechanisms.

In some embodiments, the receptacle 140 is configured to hold and secure the consumable 120 when the consumable 120 is placed into the receptacle. In some embodiments, the consumable 120 has a weight (including the substance therein) of about 5 lbs or less (e.g., about 5 lbs, about 4 lbs, about 3 lbs, or less, including any values and sub ranges in between). In some embodiments, the processing chamber 112 is sized and configured to process about 15 lbs or less of the substance (e.g., about 15 lbs, about 10 lbs, about 9 lbs, about 8 lbs, about 7 lbs, about 6 lbs, about 5 lbs, about 4 lbs, about 3 lbs, about 2 lbs, about 1.5 lbs, about 1 lbs, about 0.75 labs, or less, including any values and sub ranges in between) at a given time. In this manner, the processing system and/or apparatus can be configured for "small batch" operation, and optimized for tabletop use.

In some embodiments, the receptacle 140 is configured to deliver the substance from the consumable 120 directly into the processing chamber 112. For example, the consumable 120 can be opened by an opener and the substance can move into the processing chamber 112 under gravity force. More details about openers are provided below. (* in the example that follows, the hopper effectively replaces the receptacle. There's two associated versions between the hopper and the processing chamber. 1) without an airlock and 2) with an airlock.*)

In some embodiments, the processing apparatus 110 further includes a hopper (e.g., a funnel-shaped storage bin) to receive the substance in the consumable 120 and then deliver the substance to the processing chamber 120 (e.g., before processing or during processing). In some embodiments, the processing apparatus 110 includes a valve disposed between the hopper and the processing chamber 112. In some embodiments, the valve can be controlled manually. In some embodiments, the valve can be controlled by the controller 114. In some embodiments, the valve can be configured to open (i.e. allowing the substance to pass through) before processing and close (i.e., blocking feeding of substance into the processing chamber 112) during processing.

In some embodiments, the processing apparatus 110 further includes a holding chamber (not shown and sometimes referred to as an airlock) to receive the substance in the consumable 120 from the receptacle 140, and then to deliver the substance to the processing chamber 120. In some embodiments, the processing apparatus 110 includes a valve disposed between the holding chamber and the processing chamber 112. In some embodiments, the valve can be controlled manually. In some embodiments, the valve can be controlled by the controller 114. In some embodiments, the valve can be configured to open (i.e. allowing the substance to pass through) before processing and close (i.e., blocking feeding of substance into the processing chamber 112) during processing.

In some embodiments, the processing apparatus 110 includes a hopper to receive the substance from the container 120 and an intermediate chamber to receive the substance from the hopper. The intermediate chamber then delivers the substance into the processing chamber 112 when appropriate (e.g., before processing or during processing). In these embodiments, a first valve can be disposed between the hopper and the intermediate chamber and a second valve can be disposed between the intermediate chamber and the processing chamber 112. In some embodiments, the hopper is in direct connection with the processing chamber 112 without the intermediate chamber.

The controller 114 in the processing apparatus 110 can include any suitable type of controller configured as described herein. In some embodiments, the controller 114 is configured for wireless communication with the database 130, the tag reader 115, and/or the processing chamber 112. The wireless communication can be achieved via, for example, WiFi, Bluetooth, long-term evolution (LTE) network, 4G network, 3G network, and/or the like. In some embodiments, the controller 114 is in wired communication with the database 130, the tag reader 115, and the processing chamber 112. In some embodiments, the controller 114 has a hybrid communication capability. For example, the controller 114 can communicate with the database 130 via a wireless link, while communicating with the tag reader 115 and the roaster 112 via a wired link.

In some embodiments, the controller 114 can be integrated with the processing chamber 112. In some embodiments, the controller 114 can include a micro-processor. In some embodiments, the controller 114 can include an embedded processor.

In some embodiments, the controller 114 can include or be part of a separate device, such as a smartphone or tablet, to remotely control the processing chamber 112. In some embodiments, the controller 114 can include an internal controller integrated with the processing chamber 112 and an external controller that is separate from the processing chamber 112. For example, the internal controller can include a simple FPGA or an ASIC. The external controller can include a more powerful processor and other components to wirelessly communicate with the database 130 and/or to process the information provided by the tag reader 115.

In some embodiments, the tag reader 115 can be integrated with the processing chamber 112. For example, when the substance is green coffee beans, the processing chamber/roaster 112 can receive and secure the consumable/coffee pack 120 and then read the tag 125. After acquiring specific instructions from the controller 114, the roaster 112 can automatically open the coffee pack 120 and roast the coffee beans.

In some embodiments, the tag reader 115 can be a separate device (also referred to as an external device) from the processing apparatus 110. For example, the tag reader 115 can include a portable barcode scanner, and the tag 125 can include a bar code. In some embodiments, the tag reader 115 can include a portable QR-code reader, and the tag 125 can include a QR code. In some embodiments, the tag reader 115 can include a portable Universal Product Code (UPC) reader, and the tag 125 includes a UPC code. In some embodiments, the tag reader 115 can include a portable radio frequency identification (RFID) reader, and the tag 125 includes an RFID tag. The tag reader 114 then transmits the scanned information to the controller 114 via a wired or wireless link.

In some embodiments, the tag reader 115 and the controller 114 can be integrated into a single device. For example, the tag reader 115 and the controller 114 can be integrated into a smartphone, which can read the tag 125 via a camera included in the smartphone. The controller 114 of the smartphone can also be configured to parse the read information, communicate with the database 130, and provide instructions to the roaster 112 to roast the coffee beans.

In some embodiments, the tag reader 115 can be integrated with the receptacle 140. For example, when the consumable 120 is placed into the receptacle 140, the tag reader 115 can then automatically read the tag 125. In some embodiments, a sensor can be used to detect the presence (or the absence) of a consumable 120. Once a consumable 120 is detected, the controller 114 can then direct the tag reader 115 to read the tag 125.

In some embodiments, the tag reader 115 is integrally formed with the processing apparatus 110 and is disposed outside the receptacle 140. In some embodiments, a user can scan the consumable 120 using the integrated tag reader 115 and then place the consumable 120 into the receptacle 140. In some embodiments, a user can scan the consumable 120 using the integrated tag reader 115 and then directly pour the substance in the consumable 120 into the processing chamber or a hopper operatively connected to the processing chamber 112.

Explained hereon with respect to the embodiments where the substance is unroasted green coffee beans, various types of information can be read by the tag reader 115 from the tag 125. Said another way, various types of information can be included (or encoded) into the tag 125. In some embodiments, the tag 125 can include roasting directions in a data format that can be directly implemented by the processing chamber/roaster 112. In such instances, the tag reader 115 can directly transmit the instructions to the roaster 112. In such instances, the controller 114 may not consult with the database 130 for each consumable/coffee pack 120 received by the processing apparatus 110. In some embodiments, the tag 125 includes roasting directions that can be parsed by the controller 114. After parsing, the controller 114 then transmits the instructions to the roaster 112. Similarly, the controller may not consult with the database 130 before sending the instructions to the roaster 112.

In some embodiments, the tag 125 includes identification information (or address information) that can relate the coffee pack 120 to a particular set of instructions in the database 130. In some embodiments, the identification information includes a serial number. The tag reader 115 can acquire the serial number from the tag 125 and then consult with the database 130 to retrieve the processing instructions corresponding to this serial number. In some embodiments, the identification information includes an alphanumeric code, and the tag reader 115 can acquire the alphanumeric code from the tag 125 and then consult with the database 130 to retrieve the processing instructions corresponding to this alphanumeric code.

In some embodiments, the tag 125 includes additional information for the user to modify and/or improve the roasting process and/or product (i.e., roasted coffee beans). In some embodiments, the tag 125 includes the information about the type of the green coffee (e.g., varietal, origin, elevation, milling process, etc.) in the coffee pack 120. In some embodiments, the tag 125 includes the information about the origin of the green coffee (e.g., Brazil, Colombia, or Hawaii, etc.). In some embodiments, the tag 125 includes the expiration date of the green coffee in the coffee pack 120. In some embodiments, the tag 125 includes the age of the green coffee in the coffee pack 120. The expiration or the age of the green coffee is information used by the controller to generate and/or modify roasting instructions, including the scenario where the roasting instructions indicate that the green coffee should not be roasted. For example, if the green coffee in a coffee pack 120 has already expired (e.g., was packaged or otherwise originated prior to a predetermined date or time period), the controller can be configured to stop the processing apparatus 110 from roasting the green coffee in that coffee pack 120.

In some embodiments, the tag 125 includes processing information for the controller 114 to generate the processing instructions. For example, the tag 125 may include a desired or recommended roast level of the green coffee. For example, the desired or recommended roast level can be light roast, dark roast, or any other degree of roast. Upon receipt of the desired or recommended roast level, the controller 114 then generates the processing instructions by adjusting the additional processing information (e.g., temperature profile) from the database 130.

The roasting instructions, either acquired from the tag 125 or retrieved from the database 130 based on information included in the tag 125, effectively includes a set of operation parameters for the roaster 112 to roast the green coffee in the coffee pack 120. In some embodiments, the roasting instructions include a temperature over time curve T(t), where T is the roasting temperature and/is time.

The roasting process temperatures can be defined or characterized in several ways. In some embodiments, the roaster 112 can roast the coffee beans via hot air and the roasting inlet temperature $T_g$ can be characterized as the temperature of the gas stream entering the roasting chamber (also referred to as the inlet temperature) in the roaster 112. The roasting temperature 76 can be characterized as the temperature of the coffee beans in the roaster 112 during roasting. In such instances, the roasting temperature T can be acquired by, for example, a temperature probe in contact with the coffee. $T_e$ can be characterized as the temperature of the gas stream leaving (e.g. exhausting) the roasting chamber during roasting.

In some embodiments, the roaster 112 is configured to, based on the roasting instructions, automatically roast the green coffee without human intervention. For example, the user can simply load the coffee pack 120 into the system 110, the tag reader 115 then automatically reads the tag 125, and the controller 114 can retrieve roasting instructions from the database 130 and transmit the roasting instructions to the roaster 112 to perform the roasting.

In some embodiments, the user can input some of the parameters based on the roasting instructions. In some embodiments, in addition to the roasting instructions retrieved from the database 130, the user can also set a roasting preference, such as light roasts, medium roasts, medium dark roasts, and dark roasts. In some embodiments, the user can update the roasting instructions based on the taste of the roasted coffee. This allows the platform 100 to accommodate different tastes of different people, or to accommodate the same person's tastes at different times.

In some embodiments, the roasting instructions can include a set of default instructions. During operation, the user can provide some other parameters to modify the default instructions so as to derive the actual instructions for the roaster 112. In some embodiments, the user can provide environmental information such as the ambient temperature, the humidity, or any other environmental parameters in the proximity of the roaster 112. The controller 114 can then update the roasting instructions by taking into account this environmental information. In some embodiments, the environmental information can be automatically detected and provided to the controller 114 by sensors included in the processing apparatus 110. In some embodiments, the environmental information can be manually provided by the user.

In some embodiments, the roasting instructions can be displayed for the user and then the user can manually input these instructions to the roaster 112. In this instance, the roaster 112 can operate manually.

As discussed herein, in some embodiments, the tag reader 115 can read the tag 125 using radio frequency identification (RFID) techniques. In such instances, the tag 125 includes a RFID tag and the tag reader 115 includes a RFID reader. The frequency used by the RFID technique can be about 100 KHz to 10 GHz (e.g., about 100 KHz, about 200 KHz, about 300 KHz, about 500 KHz, about 800 KHz, about 1 GHz, about 2 GHz, about 3 GHZ, about 5 GHz, about. 8 GHz, or about 10 GHz, including any values and sub ranges in between).

In some embodiments, the tag reader 115 can read the tag 125 using barcode techniques. In some embodiments, the barcode includes one-dimensional (1D) barcode. In such instances, the 1D barcode can be read by a scanner and can include information such as a serial number of the pack 120 that includes the tag 125. In some embodiments, the barcode includes a two-dimensional (2D) barcode. In such instances, the 2D barcode can be directly read by a smartphone (e.g., via a smartphone camera) and direct the smartphone to, for example, a webpage including roasting instructions for the coffee beans contained in the coffee pack 120. The controller 114 can then parse the webpage and acquire specific instructions to control the roaster 112. In some embodiments, the processing apparatus 110 can include a 2D barcode reader as the tag reader 115 to read the tag 125.

In some embodiments, the tag reader 115 can read the tag 125 using optical pattern recognition techniques to read patterns included on the tag 125. In some embodiments, the optical pattern recognition techniques can include the optical character recognition (OCR) technique. In some embodiments, the OCR reads characters on the tag 125. In some embodiments, the OCR reads numbers on the tag 125 and the numbers can form a serial number so as to allow the controller 114 to locate and retrieve from the database 130 the roasting instructions corresponding to this serial number.

In some embodiments, the tag 125 can include one or more magnetic stripes and the tag reader 115 accordingly can include a magnetic stripe reader. In some embodiments, the tag 125 can include a data storage device such as a memory chip. In some embodiments, the tag reader 115 can read the tag 125 using any other automatic identification and data capture (AIDC) techniques known in the art.

In some embodiments, it can be desirable to use the consumable/coffee pack 120 only once and avoid reuse. In such instances, the controller 114 can be configured to store each processing information (e.g., a serial number) into a memory. Once another consumable 120 is placed into the processing apparatus 110, the tag reader 115 reads the tag 125 and sends the processing information, including the serial number to the controller 114, which then checks the memory to determine whether the newly detected serial number was detected before. If the controller 114 determines that the latest serial number was used before, the controller 114 can generate an alert signal to the user. In some embodiments, the controller 114 can shut down the processing apparatus 110 in response to the detection of a used consumable 120. In some embodiments, the controller 114 can temporarily lock the processing system from use in response to the detection of a used consumable. In some embodiments, the controller 114 can generate and present a warning to the user, such as via an audio and/or visual indicator, for example.

The pairing (also referred to as mating) between the processing apparatus 110 and the coffee pack 120 as facilitated by the tag reader 115 can be generally referred to as digital pairing. In other embodiments, the processing apparatus 110 can be physically paired with the coffee pack 120. For example, the processing apparatus 110 may include a number of receiving ports to receive the coffee pack 120 of specific geometry which can ensure proper batch sizing and other coffee quality attributes. In some embodiments, each receiving port may only receive one type of coffee pack 120 and correspond to a specific set of roasting instructions.

In some embodiments, the processing apparatus 110 includes a sensor (e.g. one of the sensors 116) configured to detect the pairing status of the receptacle 140. For example, if the sensor detects that a consumable 120 is properly received by the receptacle, the controller 114 then can direct an opener to automatically open the consumable 120 and start the processing procedures.

In some embodiments, the processing apparatus 110 can include one or more optional sensors 116 to monitor the operational or environmental parameters. In some embodiments, the sensors 116 can provide real-time, periodic, and/or on-demand feedback information to the controller 114 to adjust the operational parameters. For example, the sensors 116 can include a temperature sensor and the controller 114 can be configured to increase or decrease the roasting temperature based on the temperature information provided by the sensors 116. In some embodiments, the temperature sensor can be in direct contact with the substance to measure the temperature of the substance. In some embodiments, the temperature sensor can be coupled to the wall of the processing chamber 112 to measure the wall temperature as an indicator of the substance temperature.

In some embodiments, the sensors 116 can include multiple temperature sensors disposed at various locations in the processing apparatus 110. For example, a first temperature sensor can be disposed near the inlet of the processing/roasting chamber 112 to measure the temperature of inlet air into the chamber, a second temperature sensor can be disposed near the outlet of the roasting chamber 112 to measure the temperature of the exhaust air from the chamber, and a third temperature sensor can be disposed in the roasting chamber 112 to measure the air temperature within the processing chamber 112. In some embodiments, the controller 114 can consolidate and process the signals from all temperature sensors to derive an accurate value of the substance temperature, i.e., of the coffee beans during roasting.

In some embodiments, the sensors 116 can store the acquired parameters into a memory. For example, the sensors 116 can measure and store the temperature profile or curve applied during roasting. In some embodiments, the temperature curve can be sent back to the database 130 and provide information for the service party to update the database 130 if needed. In some embodiments, the temperature curve can be employed by the user to find out his or her favorite roasting settings.

In some embodiments, the sensors 116 can include a humidity sensor to measure ambient humidity. The controller 114 may modify the processing instructions based on the ambient humidity. For example, the controller 114 may increase the processing temperature in response to high humidity in the environment. As another example, the controller 114 may increase the airflow within the processing chamber 112 in response to high humidity in the environment.

In some embodiments, the sensors 116 can include a humidity sensor to track moisture content of the coffee beans during roasting over time so as to estimate the degree of roasting. In such instances, the humidity sensor can be disposed within the processing chamber 112 to detect the humidity of air within the processing chamber 112. Based on the detected humidity, the controller 114 can change the operation parameter of the processing chamber 112.

In some embodiments, the sensors 116 can include a color sensor to measure the color of the substance in the processing chamber 112. Based on the detected color, the controller 114 can determine the degree of processing (e.g., degree of roasting) and accordingly adjust the operation parameter of the processing chamber 112 (e.g., temperature or duration). In some embodiments, the color sensor is configured to measure a change of color of the substance. In some embodiments, the color sensor detects the color or color change using a laser. In some embodiments, the color sensor detects the color or color change using a white light light-emitting diode (LED).

In some embodiments, the sensors 116 can include a location sensor (also sometimes referred to as a location tracking device) to determine the physical location of the processing chamber 112. In some embodiments, the location sensor is configured to measure an altitude of the processing chamber 112 and the controller 114 can modify the processing instructions based on the altitude. For example, a higher altitude may indicate a higher airflow rate. In some embodiments, the location sensor can include a GPS receiver. In some embodiments, the location sensor can include an atmospheric pressure sensor or any other device to measure the altitude.

In some embodiments, the various sensors 116 can be prioritized when adjusting the operation parameter of the processing apparatus 110. In some embodiments, during the processing of the substance contained in one consumable 120, the controller 114 may first rely on the temperature sensor(s) to control operation of the processing chamber 112, and later (in the processing cycle) rely on the color sensor close to the end of the processing to control the processing chamber 112. For example, the color sensor may be used during about the last 15% of a processing cycle (e.g., about 15%, about 12%, about 10% or less, including any values and sub ranges in between). In some embodiments, the color sensor may be employed during about the last 2 minutes of a processing cycle (e.g., about 2 minutes, about 1.5 minute, about 1 minute, or less, including any values and sub ranges in between).

In some embodiments, the processing apparatus 110 can employ a "multi hopper" mode to load the green coffee beans and support sequential roasting of multiple coffee packs 120 over a period of time. In this mode, the user can load the processing apparatus 110 with multiple coffee packs 120 for roasting so that batches can be roasted continuously until the coffee supply runs out. For example, if one roast of 2 pounds of coffee takes 10 minutes, the multi hopper mode can allow for 20 pounds of green coffee to be loaded in the hopper so that 10 rounds of roasting could be run before the roaster needs any additional human intervention. In this manner, while the apparatus 110 can be configured for small batch/single consumable operation, it is capable of automated processing of multiple batches over time with little or no intervention, thereby improving efficiency. In some embodiments, multiple coffee packs 120 can be simultaneously received by the processing apparatus 110, which roasts green coffee in one coffee pack 120 at a given time. In some embodiments, a single coffee pack 120 can contain a large amount of green coffee (e.g., greater than 20 lbs) and the processing apparatus 110 is configured to process one portion (e.g., less than 10 lbs) at a given time; said another way, the processing apparatus 110 can be configured to process less than the entirety of the green coffee in a single coffee pack 120 at a given time. In such embodiments, the processing apparatus 120 can include a mechanism to determine the weight of green coffee in the processing chamber 112. In some embodiments, the mechanism can be configured to measure the weight of green coffee in the processing chamber 112 and/or in the holding/airlock chamber. In some embodiments, the mechanism can be configured to measure the duration of opening of a valve on the processing apparatus 112 and then estimate the weight of green coffee dispensed into the processing chamber 112 based on that duration and (optionally) a flow rate of green coffee. The flow rate can be estimated using any suitable technique for estimating solid flow streams, such as ultrasonic waves or microwave radiation.

In some embodiments, the processing apparatus 110 includes a tray (also sometimes referred to as a cooling tray) to receive the substance after processing. In some embodiments, the receptacle 140, the processing chamber 112, and the cooling tray collectively define a common axis. In such instances, the substance can move under the force of gravity from the receptacle 140 to the processing chamber 112, and from the processing chamber 112 to the tray. In some embodiments, the processing apparatus 110 includes a gas source (e.g., air) to produce a gas flow (e.g. through an "air blade" or air nozzle) to facilitate the movement of the substance from the processing chamber 112 to the cooling tray.

In some embodiments, the processing apparatus 110 includes an agitator removable or fixedly coupled to the tray and configured to agitate the tray so as to increase the cooling efficiency. In some embodiments, the processing apparatus 110 includes a gas source coupled to the tray to produce a gas flow passing through the tray to facilitate the cooling. In some embodiments, the tray is removably coupled in the processing apparatus 110. In such instances, a user can remove the tray and dispense the processed substance into another container (e.g., a bulk bin container that contains multiple roast batches). In addition, a user may also use different trays to accommodate different substances.

In some embodiments, the processing apparatus 110 includes a filter operably coupled to the tray and configured to remove particles, such as coffee chaff generated during the roasting process, having a diameter less than a predetermined diameter. In some embodiments, the predetermined diameter can be from about 0.1 mm to about 2 mm (e.g., about 0.1 mm, about 0.2 mm, about 0.3 mm, about 0.5 mm, about 1 mm, about 1.5 mm, or about 2 mm, including any values and sub ranges in between).

In some embodiments, the processing apparatus 110 can include a multi stage cooling system for the roasted coffee beans, which can be useful when the apparatus 110 is operating in the multi-hopper mode as described herein. In such embodiments, the processing apparatus 110 can allow a user to load multiple consumables (i.e., multiple coffee packs 120), initiate a roast sequence, and then walk away for multiple batches of coffee roasting. In such cases, the processing apparatus 110 can include a cooling system so that multiple roast batches can be cooled. The cooling system can include a receptacle for a removable bowl, such that when the bowl received a batch of roasted coffee beans, a user or another mechanical component can swap out that bowl for another when the coffee in that bowl has cooled sufficiently, and before the next batch of roasted coffee is completed.

In some embodiments, the consumable/coffee pack 120 can be manually opened by a user, and the user then pours the unroasted green beans from the consumable 120 into the processing chamber 112. In some embodiments, the processing apparatus 110 includes an opener to open the consumable 120. In some embodiments, the opener is operably coupled to the receptacle 140 such that when the consumable 120 is in place the opener can open the consumable 120 and release the substance. In some embodiments, the opener includes a blade configured to slice open the container, and the processing chamber 112 receives the substance based on the gravity-driven movement of the substance. In some embodiments, the opener includes a rotating wheel opener. In some embodiments, the opener includes a church key punch opener. In some embodiments, the opener includes a mechanism for opening a perforated box. More details about openers are described below with reference to FIGS. 11A-11C, 12A-12D, 13A-13D, and 18A-18G.

In some embodiments, the processing apparatus 110 includes a user interface for a user to control the operation of the processing apparatus 110. In some embodiments, the user interface includes a touch screen that is configured to display different operation modes of the processing apparatus 110. For example, the touch screen may be configured to display different roasting options (e.g., dark roast, medium roast, or light roast) and in response to selection by the user, the controller 114 can then adjust the processing instructions, such as roasting temperature and/or time, so as to achieve the selected roasting option.

In some embodiments, the user interface includes a device communicatively coupled to the controller 114. For example, the user interface can include a tablet wirelessly connected to the controller. In another example, the user interface can include a smartphone wirelessly connected to the controller.

The following description illustrates the use of the platform 100 for coffee roasting in greater detail, and in a typical use setting. It is understood that one of ordinary skill in the art can adapt the system 100 to process any other substance that is provided in a tagged consumable.

In some embodiments, the platform 100 can be adapted to perform on-site, benchtop/tabletop coffee roasting. In such instances, the processing apparatus 110 includes a processing apparatus 110 and the consumable 120 includes a coffee pack 120 containing green coffee (i.e., unroasted coffee beans). In some embodiments, the coffee pack 120 contains partially roasted coffee (sometimes also referred to as pre-roasted coffee beans, or pre-treated coffee beans). Pre-treatment of the green coffee can reduce the water content in the beans and therefore reduce the weight of the coffee. The reduction of the weight can accordingly reduce shipping cost.

In some instances, a user (e.g., a coffee shop and/or an individual customer making coffee at home) associated with the processing apparatus 110 operates the processing apparatus 110 to roast green coffee, while the third party provides the coffee pack 120 and maintains the database 130. The service party can include, for example, a green coffee importer or distributor. The coffee pack 120 contains green coffee (sometimes also referred to as raw coffee beans or unroasted coffee beans) and a tag 125 providing roasting instructions (sometimes also referred to as a roast profile). The processing apparatus 110 further includes a roaster 112 to roast green coffee, a controller 114 to control the operation of the processing apparatus 110, and a tag reader 115 to read the tag 125 included in the coffee pack 120.

In operation, the user places the coffee pack 120 into the processing apparatus 110. The tag reader 115 in the processing apparatus 110 reads the tag 125 and transmits the information in the tag 125 to the controller 114. The controller 114 then provides specific instructions to direct the roaster 112 to roast the coffee beans contained in the coffee pack 120 based on the information contained in the tag 125. The specific instructions can be acquired directly or indirectly from the database 130, as described in more detail herein. Since the specific instructions are provided by the service party and encoded in the coffee pack 120 which is ready for immediate use, the user can roast the green coffee without developing any expertise in coffee roasting, thereby enabling a wide range of people to make freshly roasted coffee.

The processing apparatus 110 can employ a single hopper approach. Each time, the processing apparatus 110 receives one coffee pack 120 and roasts the green coffee beans in the coffee pack 120. The processing apparatus 110 then stops operation until a second coffee pack 120 is provided. In some embodiments, the roasting system can 110 can further include a loading structure (not shown in FIG. 1) to load the coffee beans. In some embodiments, the loading structure can include frontend robotic systems or arms. In some embodiments, the loading structure can include conveyor belts. In some embodiments, the loading structure can include pneumatic tubes using compressed air or vacuums.

To achieve the temperature over time curve T(f) included in the roasting instructions, the processing apparatus 110 can include heating and cooling elements to modulate the roasting temperature and circulate the coffee beans for uniform roasting. In some embodiments, the processing apparatus 110 can include convective heating and a fluidized bed technique for lofting the coffee beans during the roast process. In some embodiments, the processing apparatus 110 can include air blades or air nozzles for accelerating hot air velocity for roasting. In some embodiments, the processing apparatus 110 can use induction heating to roast the coffee beans. In some embodiments, the processing apparatus 110 can use a combination of convective heating, conductive heat, and induction heating to develop additional coffee flavor profiles during the roasting process. In some embodiments, an external heating source can be used for the roast chamber and the coffee can be mechanically circulated in the roast chamber. The speed or degree of mechanical agitation can also be varied.

In some embodiments, the roaster 112 in the processing apparatus 110 can include a retail-scale automated coffee roaster, which can be sized to fit a regular-sized coffee shop or kitchen. For example, the footprint of the roaster 112 can be less than 6 feet×6 feet, less than 5 feet×5 feet, or less than 4 feet×4 feet. These dimensions can allow most coffee shops, grocery stores, bakeries and other retailers to carry out their own roasting and serve freshly roasted coffee.

In some embodiments, the roaster 112 can include a table-top coffee roaster, which can be placed on a counter. In such instances, the footprint of the roaster 112 can be, for example, less than 3 feet×3 feet.

In some embodiments, the roaster 112 in the processing apparatus 110 can include a counter-top coffee roaster, which can be conveniently placed in a home kitchen. For example, the footprint of the roaster 112 can be less than 1 foot×1 foot. These dimensions can allow individual users to roast and serve coffee at home.

As discussed above, the coffee pack 120 is usually provided by a service party. In some embodiments, the service party can receive large packs of green coffee of the same type. For example, each package of the green coffee can be about 40 kg to about 70 kg. The service party can then use a small portion of the green coffee for test roasting so as to determine the roasting instructions for the remaining portion of the green coffee in the same large pack or lot.

In some embodiments, the service party provides all the roasting instructions for the user so as to allow fully automated roasting of the processing apparatus 110. In some embodiments, the service party provides a formula for the user to calculate a customized roasting instruction. For example, the service party can provide a formula taking into account the environmental parameters (e.g., ambient temperature and humidity) and the user can plug in these environmental parameters so as to generate the customized roasting instruction. In some embodiments, the service party can provide a set of roasting instructions, each of which corresponds to a roasting preference (e.g., light roast, medium roast, or dark roast). The user can then select the preference.

Once the roasting instructions are acquired, the service party can transmit the roasting instructions to the database 130. In some embodiments, the database 130 can include a cloud database such that the user can connect to the database 130 anywhere in the world. In some embodiments, the cloud database can perform periodical synchronization with the user's processing apparatus 110.

In some embodiments, the service party includes the roasting instructions in the tag 125 included in the coffee pack 120. In some embodiments, the service party includes a serial number in the tag 125 and transmits roasting instructions corresponding to the serial number to the database 130. In such instances, the user can first read the serial number and then consult with the database 130 to retrieve the corresponding roasting instructions. In some embodiments, the service party can include any other identification information in the tag 125 so as to allow the user to retrieve the appropriate roasting instructions.

In some embodiments, the user can consult with the database 130 to retrieve roasting instructions each time after reading the tag 125 on a coffee pack 120. In some embodiments, the user can store some frequently-used roasting instructions in a local memory and consult with the local memory after reading the tag 125 to retrieve roasting instructions.

In some embodiments, the platform 100 allows the user to use a smartphone and a cloud based application executing thereon to conveniently manage the integrated coffee roasting. In some embodiments, the user can use the smartphone to order unroasted coffee beans from the service party. In some embodiments, the user can use the smartphone to read the tag 125 on the coffee pack 120 (e.g., using the camera in the smartphone). In some embodiments, the user can use the smartphone to retrieve roasting instructions from the database 130 based on information read from the tag 125. In some embodiments, the user can use the smartphone to remotely control the roaster 112 by sending roasting instructions to the roaster 112. In some embodiments, the user can use the smartphone to retrieve brewing instructions to brew the roasted coffee roasted by the processing apparatus 110. The brewing instructions can be provided by the service party or another party.

In some embodiments, the user can use the smartphone to order green coffee and the order can include roasting instructions electronically transmitted to the smartphone upon the placement of the order. In such instances, the user may not need to read the tag 125 or the coffee pack 120 may not include the tag 125.

The platform 100 has several advantages compared to conventional coffee roasting methods. The platform 100 is an integrated, consumable-based coffee roasting system. Within coffee roasting, there are the large format roasters as described previously and there are a few smaller, "retail scale" roasters. For example, there are several commercially available small retail scale roasters that are semi-automated, have limited system controls for tuning roast parameters, with installed costs in the range of $25,000. Therefore, machines of this type become cost prohibitive for many retailers. In contrast, the platform 100 can provide users with significant upfront capital and ongoing labor savings. The platform can also provide enhanced quality and consistency, by automatically replicating the desired roast profile for each roasted batch.

The platform 100 allows wireless connectivity between the user and the service party. In some embodiments, the wireless communication can facilitate tracking of the execution of roast protocols. For example, the user can transmit the measured temperature profile T(t) to the service party and the service party can estimate whether the desired temperature profile T(t) is faithfully executed. In some embodiments, the wireless communication can facilitate remote tracking of coffee roasts, allowing real-time instructions from the service party if needed. In some embodiments, the wireless connectivity allows the user to carry out consumable inventory management.

Furthermore, the platform 100 allows the user to store and access information related to the coffees they purchase or prefer through a cloud based application. With the platform 100, the user can eventually select their preferred green coffee, order roasted coffee to their specification through the system, and have the coffee and roast tailored to their preferences.

In some embodiments, the platform 100 can be used for coffee roasting. In some embodiments, the platform 100 can be used for on-site roasting of nuts, such as chestnuts, hazelnuts, almond, cashews, pistachio, and walnuts, among others. In some embodiments, the platform 100 can be used for roasting cacao.

FIG. 2 illustrates a method 200 of integrated coffee roasting, according to embodiments. The method 200 can, in some embodiments, be executed by the processing apparatus 110, or a structurally/functionally similar variant thereof. At step 210 of the method 200, a service party receives consumables (e.g., sacks) containing green coffee beans (referred to as coffee X). In some embodiments, the service party can receive imported green coffee directly at the port. In some embodiments, the service party can receive the green coffee from a distributor. In some embodiments, each sack can include about 40 kg to about 70 kg of green coffee.

At step 220 of the method 200, a portion of coffee is roasted in the service party's facility by a roastmaster, who determines and generates the specific roast parameters included in a temperature time curve T(t). In some embodiments, the roastmaster can use a roasting system that is substantially identical to the processing apparatus 110 shown in FIG. 1. In some embodiments, the roastmaster can use a roasting system different from the processing apparatus 110 shown in FIG. 1. For example, the roasting system used by the roastmaster can include an integrated color sensor to facilitate the generation of roaster parameters. In some embodiments, the color sensor and the controller can form a roast degree analyzer to determine the degree of roasting based on the color.

In some embodiments, the temperature time curve T(t) can depend on blower setting, heater temperature, and exhaust temperature, among others. At step 220, the service party also stores the roast parameters in an appropriate data format.

At step 230 of the method 200, the service party places the green coffee beans into small packages for the user and includes roasting instructions or roasting instruction identification information into a tag included in the small packages. In some embodiments, coffee X can be loaded into a consumable filling machine and consumables are produced. In some embodiments, the roast parameters can be stored in RFID memory on the consumable. In some embodiments, the roast parameters are stored in a cloud database.

Also at step 230, the service party can estimate appropriate roast size corresponding to the physical characteristics of the roaster that would be used to roast the green coffee. In some embodiments, the amount of green coffee in each package can be about 500 grams to about 2000 grams (e.g., about 500 grams, about 600 grams, about 750 grams, about 1000 grams, about 1200 grams, about 1400 grams, about 1500 grams, about 1750 grams, or about 2000 grams, including any values and sub ranges in between).

In some embodiments, the amount of roasted coffee in each package can be kept the same by taking in account variations in the density and moisture content in green coffee. In such instances, the green coffee in each package may have different weights. In some embodiments, the amount of coffee after roasting can be about 300 grams to about 2000 grams (e.g., about 300 grams, about 500 grams, about 600 grams, about 750 grams, about 1000 grams, about 1200 grams, about 1400 grams, about 1500 grams, about 1750 grams, or about 2000 grams, including any values and sub ranges in between).

At step 240 of the method 200, the user receives and loads the consumable(s) into a roaster (e.g., the processing apparatus 110 shown in FIG. 1). Loading the consumable can be achieved in any suitable manner. In some embodiments, the consumable can be a flexible package with a specific geometry and made from a coffee industry standard barrier film. In some embodiments, the consumable can be "loaded" into the roaster by manually opening the bag and pouring the green coffee into the coffee loading hopper. In some embodiments, a coffee package having a flexible/compliant casing can be coupled to a more rigid handle or frame that might enable easier loading and/or physical mating with the machine via clips, tracks, or any other means known in the art.

In some embodiments, the consumable, once loaded into the roaster, can be sliced open by a cutting mechanism integrated with the roaster, which can then eject the "used" consumable components (e.g., cut open bag plastic and frame/handle piece).

In some embodiments, the consumable couples with the roaster, for purposes of transferring the green coffee and contents of the consumable to the roast chamber, using any suitable mechanical interface(s). In some embodiments, the interface can include a zipper. In some embodiments, the interface can include a mechanical interface. In some embodiments, the interface can include an interlocking interface with a male and female component. In some embodiments, the interface can include mechanical tearing along a perforation.

At step 250 of the method 200, the roasting system as used by the user reads the tag included in the consumable to retrieve roasting instructions. In some embodiments, the consumable digitally mates with the roasting system (e.g., via RFID, barcode, optical recognition, and/or the like), which allows the roasting system to recognize the specifics of the consumable, the contents of the consumable, and information related to the contents of the consumable (e.g., coffee type, origin, age, roast profile, etc.). These specifics then allow the roasting system to set the roast parameters by matching the green coffee to the same coffee that was test roasted at headquarters by the roast master.

In some embodiments, the tag is read after the consumable is loaded into the roaster, i.e. 250 is after 240. In some embodiments, the tag can be read by an external device before the package is loaded into the roaster. The external device then transmits the information on the tag to the roaster so as to control the roaster to roast the green coffee, i.e. 250 precedes 240. The tag reader can also be connected to, or be formed on, an interface of the roaster, instead of on the consumable receptacle (e.g., the receptacle 140).

At step 260 of the method 200, the roasting system roasts the coffee following the roasting instructions retrieved at step 250. In some embodiments, the roasting system can roast batches in sequences. This can be achieved through a multi-chamber hopper and a multistage cooling tray. In some embodiments, the consumables can be designed so that they are connected to each other in a manner that allows them to be loaded continuously. In some embodiments, the roasting system can automatically weigh out the batches from a large hopper or from a multi-batch consumable. In some embodiments, the roasting system can measure the weight of green coffee for each roast. For example, the roasting system can be configured to roast less than 15 lbs of green coffee at a given time, and to accordingly close the hopper once it determines that about 15 lbs of green coffee is already dispensed into the roasting chamber.

FIG. 3 illustrates a schematic of an example environment/system 300 for integrated coffee roasting, including additional detail on the production of consumables at a service party facility. Unless noted otherwise, components similarly named to those disclosed in FIGS. 1-2 can be structurally and/or functionally similar. The system 300 includes a service party facility 310, a customer site 320, and a database 330. In some embodiments, the database 330 may encompass cloud-based storage. In the service party facility 310, large sacks of green coffee are received, as indicated by the block 311. A first portion of the green coffee is then made into samples as shown in block 312. A roast master test roasts the sample green coffee and sets the roast parameters for the rest of the green coffee, as shown in block 313. The roaster parameters are then transmitted to the database 330 (which can be similar to the database 130). The service party facility 310 also executes a cloud based roaster application 314 that allows the roast master to manipulate and track roast profiles.

The green coffee that is not sampled for test roasting is then loaded into a consumable packing system 315 in the service party facility 310 to be packaged into small consumables/coffee packs. The packing system may incorporate one or more cleaning stations that substantially or at least partially removes, among other things, green coffee dust, stones, metal objects and other undesirable matter that may have been included in the bulk sacks of coffee. The packing system 315 can debulk the green coffee and dose predetermined portions of green coffee into each consumable. The packing system 315 also includes a form-fill machine to package the green coffee into flexible packages, or other consumable canisters, for the user. The packing system 315 also puts on injection-molded frame, or alternative labels, that contains identification information for each small pack. The small packs are then sent to an inventory management system 316, which manages the shipping of the small packs. In some embodiments, the small packs are further packaged into case packs.

The service party facility 310 also includes a quality control system (QCS) 317 to match the roast results of a given set of roast parameters with sensory expectations that were established from baseline analysis (sometimes referred to as cuppings). The QCS 317 is in communication with the database 330, which negotiates the exchange of information between all components of the platform 300. For example, the database 330 is connected to the roasting profile setting block 313 and each individual roasters 322. In such instances, the roastmaster transmits the roasting profile(s) for a given lot of green coffee beans to the database 330, and users who would like to roast green coffee beans in that lot can then retrieve the roasting profiles and then roast the green coffee accordingly.

The database 330 is also communicably coupled to the packaging system 315. Therefore, the identification information (e.g., serial number) of each package can be saved into the database 330. Users can then read the identification information on the tag attached to each package and retrieve the roasting profiles corresponding to the identification information from the database 330. Furthermore, the database 330 is connected to the inventory management system 316 and a user app 321, in which case users can see which green coffee is available for purchase and purchase the green coffee via their personal devices (e.g., smartphone, tablet, personal computer, etc.).

In the customer site 320, the customer receives the small packs from the service party as indicated by the block 323. Individual small packs are then picked up for roasting as shown in block 324. The roasting is carried out by a roaster 322, which can be provided by the service party. The roaster 322 is physically and/or digitally mated with the coffee packs and can retrieve roasting instructions from the database 330. The roaster 322 can also upload post-roast information back to the database 330. Upon finishing the roasting, the roaster 322 outputs roasted coffee 325 for the user. The customer site 320 also includes a customer app 321 that allows for browsing and ordering of green coffee, as well as managing all aspects of the consumer experiences. The customer app 321 is in communication with the database 330 and the roaster 322 to achieve these functions.

The small packs prepared by the service party are also referred to as consumables. As described herein, a consumable can be used in any of the systems and methods in this application. For example, the consumable can be used as the consumable 120 in the system 100 shown in FIG. 1, the coffee consumable in the systems 300 and 400 shown in FIGS. 3 and 4, respectively, and/or in the apparatus 800 shown in FIGS. SA-8D.

Using consumables as disclosed herein ensures roasting consistency by communicating the appropriate roast profile to user roasters over a network and/or via tags on the consumable. The consumable package size can be based on the roaster's single batch size, guaranteeing that the right amount of green coffee is dispensed into the roaster every time. Green coffee quality is maintained throughout storage and distribution through the consumable's package barrier properties. The roaster can automatically open the consumable, saving retail-level labor and minimizing exposure to green coffee dust.

In some embodiments, the consumable package size depends on the batch size of the roaster. For example, in some embodiments, each batch can produce about 1.5 pounds of roasted coffee and the service party provides roasters that are configured to produce about 1.5 pounds of roasted coffee in a given round of roasting. Green coffee beans vary in density and moisture content, and therefore the volume and weight of the consumable input to achieve the 1.5 pound roasted coffee output may also vary. For example, the density of green coffee can vary between about 0.63 g/ml and 0.71 g/ml, and roast loss (due to loss of moisture, and dry matter reductions) can be from about 13% to about 17%. Accordingly, to produce 680 grams of roasted coffee, the green coffee in a consumable can vary from about 764 g to about 819 g, and the volume of the consumable can vary from about 1107 ml to about 1300 ml. In some embodiments, a consumable can include additional headspace to accommodate different volume requirements.

Figure 10A:
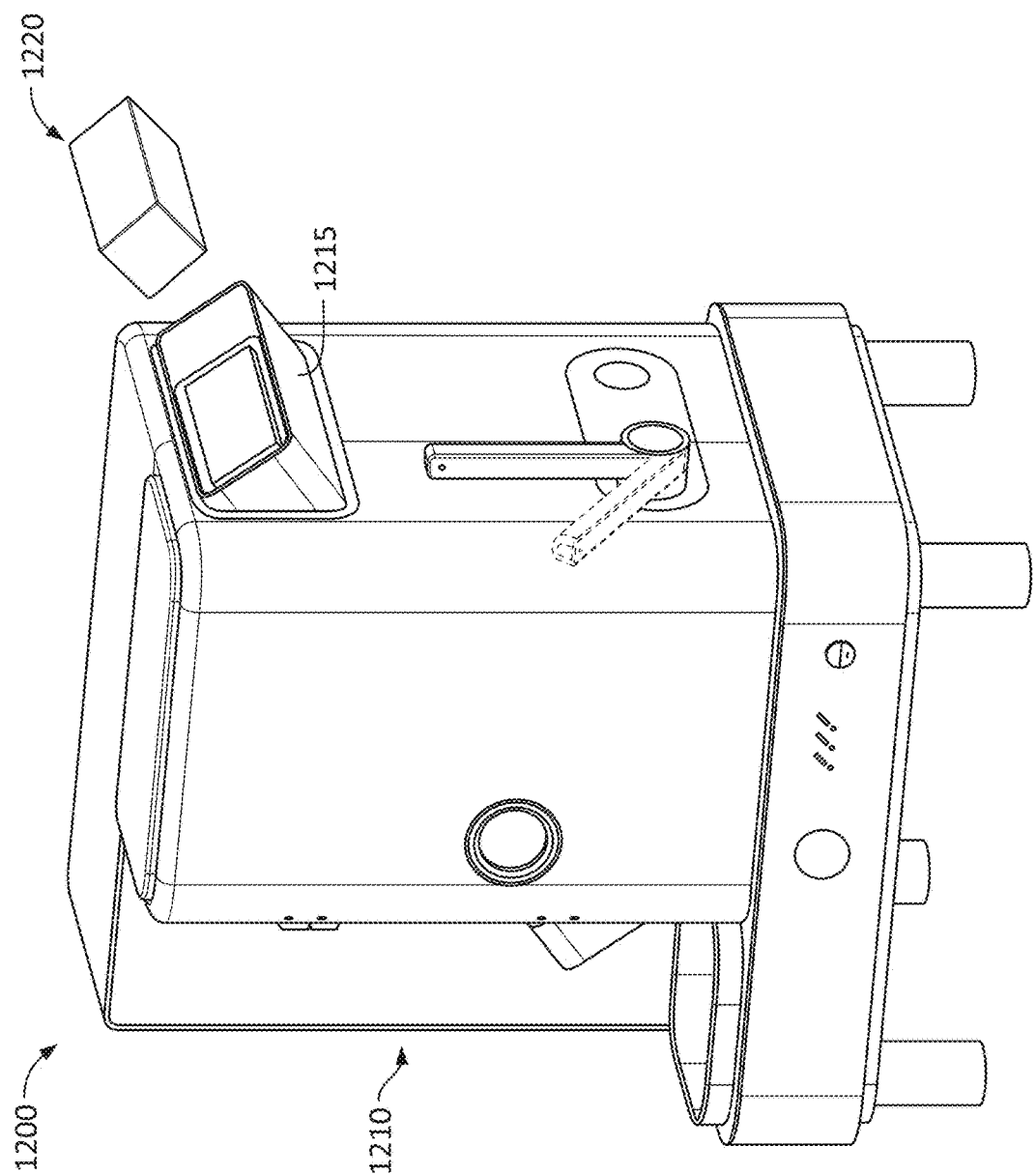
FIGS. 10A and 10B illustrate a coffee roasting system including a mechanism to open consumables within a roaster, according to embodiments.
Figure 10B:
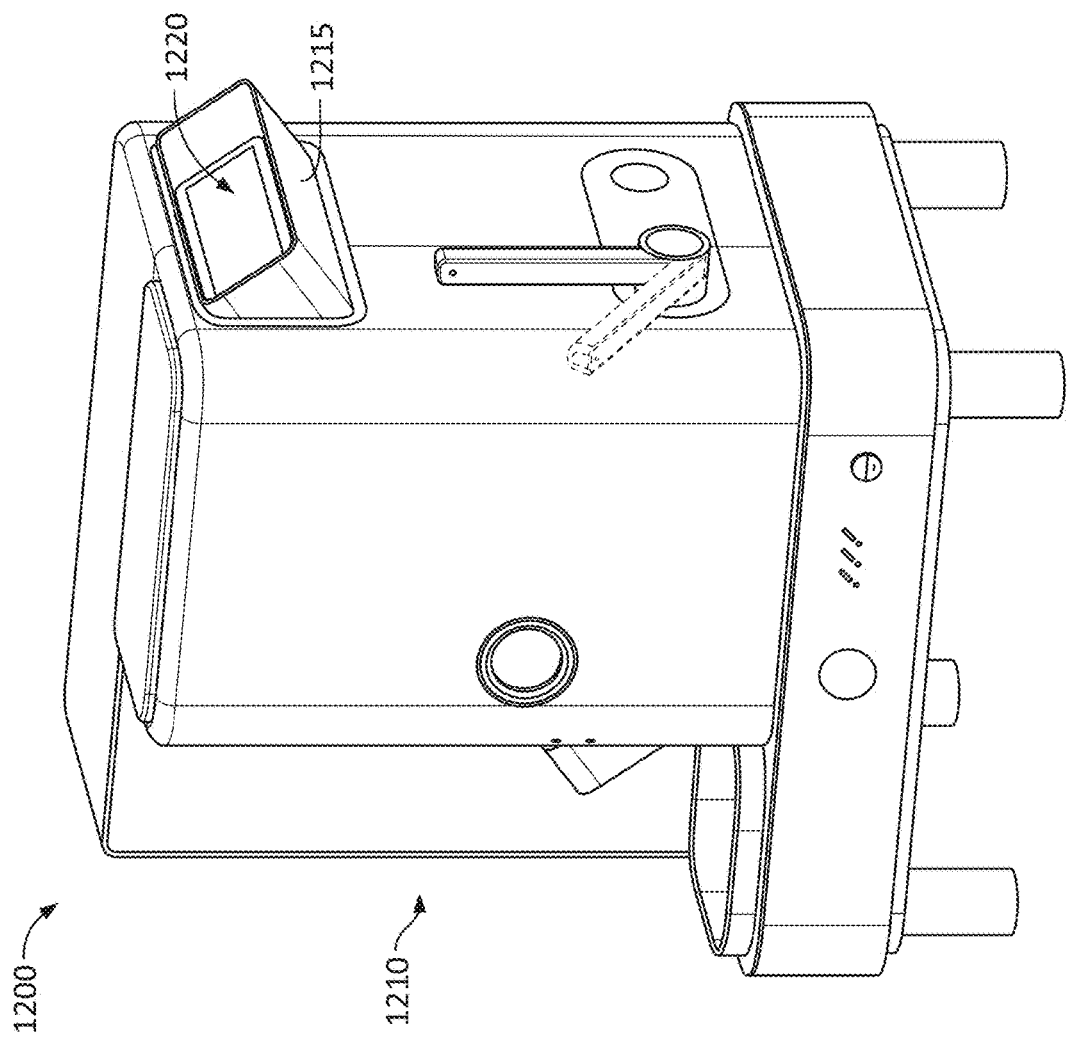

In some embodiments, a consumable is configured as a rectangular box with a square cross section (see, e.g., FIGS. 10A-10B). In some embodiments, the length of the rectangular box can be about 8 inches or less (e.g., about 8 inches, about 7 inches, about 6 inches, about 5 inches, or less, including any values and sub ranges in between). In some embodiments, other shapes, such as round, elliptical, or irregular packages, can also be used.

In some embodiments, multiple consumables can be packaged together to form a package (also sometimes referred to as a "casepack"), and each package can weigh between 25 lbs and 40 lbs for ease of handling. The package can be designed to maximize the transportation efficiency of a 48"×40" pallet, and can contain 12 or 16 consumables. In some embodiments, a smaller package might be desirable from the perspective of storage in the shop and the number of SKUs that are anticipated.

In some embodiments, the consumable can include FDA-approved materials. In some embodiments, the consumable can also be constructed of materials that have been proven not to impart off-flavors over the consumable's shelf life, e.g., that do not impart undesirable flavors to green coffee beans stored therein.

To maintain quality, the consumable packaging can provide a suitable barrier against ambient conditions. In some embodiments, the oxygen transmission rate (OTR), in cc/m2/day at 0.1 Mpa and 23° C., can be about 4.28 or less. In some embodiments, the water vapor transmission rate (WVTR), in g/m2/day at 0.1 Mpa and 38° C., can be about 2.14 or less. In some embodiments, a sealed or vacuum sealed liner at the package level can be added to improve the barrier properties.

When properly packaged, the total shelf life of green coffee beans from arrival until roasting can be approximately 1 year. In some embodiments, green coffee beans can be filled into the consumable upon arrival from origin, so the consumable can be designed to maintain green coffee for up to 1 years with no more than the standard degradation it would otherwise experience if, for example, it had been stored in a coffee industry standard sealed plastic bag liner.

In some embodiments, the labeling of the consumable can include one or more of the following information: Brand Name, Coffee/Blend Name, Flavor Description, Net Post-Roast Weight (ounces and grams); Packed On Date, Company Name, City, State and Zip Code. In some embodiments, the labeling of the consumable may include the following additional information: Origin, Producer, Variety, Process, Elevation, Company Phone Number, Company URL, and any appropriate claims, such as "USDA Organic" and "Fair Trade."

FIG. 4 shows a schematic of another example system 400 for integrated coffee roasting with additional detail on a user facility. The system 400 includes a database 430 (e.g., similar to the database 330) maintained by a service party and a consumer app 420, which allows the consumer to browse coffees and follow the roast in real time, as well as to allow the consumer to customize the roast by adjusting the roast parameters. The system 400 also includes a customer site 410. In the customer site 410, a user receives coffee packs containing green coffee beans from the service party, as indicated by block 412. The user then picks individual small packs for roasting, as indicated by block 413. The customer site 410 further includes a customer app 411, in communication with the database 430, to help the user operate the roasting process by, for example, ordering coffee beans from the service party.

The roasting of the green coffee is performed by a roaster machine 440, which includes a set of sensors, such as a barometric sensor 441a, a temperature sensor 441b, a humidity sensor 441c, and any other sensors 441d as disclosed herein in FIGS. 1-2. The sensors 441a to 441d are in communication with a roast controller 442 (e.g., similar to the controller 114, also sometimes referred to as the roast brain). The roast controller 442 includes a roast profile/parameter controller 442a, a roast initiator/monitor controller 442b, a roast calibration algorithm 442c, and a roast brain stem 442d.

The roast profile/parameter controller 442a is in communication with the database 430 to download roast information from the database 430. The roast profile/parameter controller 442a also sends post-roast information back to the database 430. The post-roast information can be used by the service party as feedback to update the database 430 or improve the roasting instructions in the database 430. In addition, the roast profile/parameter controller 442a is also in communication with a consumable unloader and bean recognizer 445a, which can read tags on the consumables to acquire identification information of the consumables and directs the roast profile/parameter controller 442a to match and retrieve the corresponding roast profile to the identification information.

The roast initiator/monitor controller 442b is coupled to a start button 443. The user can press the button 443 and initiate the roasting process. The roast initiator/monitor controller 442b is also coupled to a bean hopper 445b and a sensing system 445c coupled to the roasting chamber. The sensing system 445c can provide real-time roasting parameters for the roast initiator/monitor controller 442b to monitor the roasting process. The sensing system 445c is also coupled to a multi-roast cooling tray 445d and acquires operation parameters of the multi-roast cooling tray 445d from the roast initiator/monitor controller 442b.

The roast calibration algorithm 442c is in communication with the sensors 441a to 441d to develop the roasting instructions that take into account environmental information such as pressure (acquired by the barometric sensor 441a), ambient temperature (acquired by the temperature sensor 44ab), and ambient humidity (acquired by the humidity sensor 441c). The roast calibration algorithm 442c can consolidate these data, in combination with the data retrieved from the database 430, into actual roasting instructions, which are provided to the roast brain stem 442d.

The roast brain stem 442d is in communication with a heater/blower controller 446a, which controls the operation of heaters 446b and blowers 446c (also referred to as coolers) in the roaster machine 440. The heater/blower controller 446a receives instructions from the roast brain stem 442d and then instructs the heaters 446b and blowers 446c to achieve the temperature-time curve specified in the instructions.

In some embodiments, the consumer app 420 is distinct from the customer app 411. For example, the consumer can refer to the customer's customer, in which case the customer can be a grocery chain operating the roasting machine 440 and the consumer can be one of their shoppers. In some embodiments, the consumer app 420 can sense that the consumer (through geo-location) is on the premises of the grocery store (e.g., customer's site 410) and ask if the consumer wants to initiate a roast of the "Special Consumer Blend". The consumer app 420 can also monitor the roast and give a notification when it is ready.

FIG. 5A is an example user interface 500 usable by a user of a roasting/processing apparatus (e.g., the apparatus 110) to facilitate on-site coffee roasting, according to embodiments. The interface 500 includes a field 510 displaying the roasting profile 515 that is currently used. In some embodiments, the roasting profile 515 is manifested as temperature as a function of time (e.g. temperature curve). The field 510 also displays the current timing point 516 on the roasting curve 515 such that a user can conveniently find out the current state of roasting and the amount of time remaining. The interface 500 also includes a field 520 displaying the bean temperature, which can be acquired by, for example, sensors operably coupled to the roaster (e.g., sensors 116 shown in FIG. 1). In addition, the interface 500 also includes a field 530 displaying the amount of time after roasting starts (i.e., time lapse).

The operation status (e.g. normal) and/or any alert (e.g., reuse of consumable detected, overheat detected, or emission error detected, etc.) can be displayed in a field 540 in the interface 500. The user can also input any notes into the field 540, such as any modification from the processing instructions received from the database 430, or any customized operation parameters of the roaster. These notes can be transmitted back to the database 430 for various purposes. For example, the roastmaster may study the users' notes and update the roasting profiles saved on the database 430. Or a processor connected to the database 430 can consolidate the user's' notes and generate new roasting profiles using machine learning techniques. Furthermore, other users may view and download the user's' notes and apply them to their own roasting cycles.

FIG. 5B illustrates a field 550 that can be included in the interface 500. The field 550 displays a roasting profile manifested by a temperature-time curve 552. The field 550 also displays a curve 554 illustrating the rate of rise of the temperature-time curve 552.

FIG. 6 illustrates a method 600 of substance processing. In some embodiments, the method 600 can be executed by the apparatus 110 shown in FIG. 1 and described above, or a structurally and functionally similar variant thereof. The method includes, at 610, receiving a container containing a substance for processing. The container includes a readable tag to contain processing information associated with the substance. At an optional step 620, the readable tag is read to retrieve the processing information. The method also includes generating processing instructions at 630. The processing instructions are generated using a controller based at least in part on the processing information read from the readable tag and additional processing information received from a remote device. At 640, the substance is introduced into a processing chamber and at 650 the substance is processed based at least in part on the processing instructions.

In some embodiments, the substance includes green coffee packaged in small batches. For example, each container contains about 3 lbs or less of green coffee (e.g., about 3 lbs, about 2.5 lbs, about 2 lbs, about 1.5 lbs, about 1 lbs, or less, including any values and sub ranges in between). In such instances, a user can manage the time period between roasting and brewing coffee so as to maintain the freshness of the coffee.

In some embodiments, reading the tag is achieved using a tag reader operably coupled to a receptacle that is configured to receive the container. In such instances, when the container is in place, the tag reader can automatically read the tag to retrieve the processing information. In some embodiments, a sensor can be used to detect the presence of the container. In response to detection of an appropriate container in the receptacle, a controller can direct the tag reader to read the tag. In some embodiments, the tag is read using an external device separate from the processing chamber. The external device then transmits the processing information to the controller, which in turn generates the processing instructions.

Various types of tag readers can be used in the method 600, regardless of whether the tag reader is an external device or an integrated component in the roasting device. In some embodiments, the tag reader includes a radio frequency identification (RFID) reader. In some embodiments, the tag reader includes a barcode scanner. In some embodiments, the tag reader includes a QR code scanner.

The tag can be configured to contain various types of information. In some embodiments, the tag includes address information about the container and/or the substance within the container, and the controller is configured to generate the processing instructions by retrieving at least some of the processing instructions from a memory operably coupled to the controller based on the address information in the readable tag. In some embodiments, the address information can be used to retrieve the processing instructions from a remote server.

In some embodiments, the tag includes processing instructions that can be directly executed by the controller, which in turn controls the processing chamber to process the substance. In some embodiments, the tag includes a desired roast level of the substance after processing (e.g., type of coffee roast, such as, dark roast, medium roast, or light roast). The desired roast level is then referenced by the controller to adjust the additional processing information received from the remote server so as to generate the processing instructions.

In some embodiments, the substance is directly delivered from the container to the processing chamber. In some embodiments, the substance is disposed into a hopper, which then delivers the substance into the processing chamber. In such instances, the substance can be delivered to the processing chamber in a more controlled manner. A valve can be disposed between the hopper and the processing chamber to control the substance delivery (also referred to as substance feeding).

In some embodiments, the substance is disposed into an intermediate chamber (e.g., an airlock chamber), which in turn delivers the substance into the processing chamber. The intermediate chamber similarly allows smooth flow of the substance from the container to the processing chamber. A first valve can be disposed between the container and the intermediate chamber, and a second valve can be disposed between the intermediate chamber and the processing chamber. The two valves can collectively control the substance flow from the container to the processing chamber.

In some embodiments, the roasting system can include both a hopper and an intermediate chamber. In such instances, a first valve can be positioned between the hopper and the intermediate chamber, and a second valve can be positioned between the intermediate chamber and the processing chamber.

In any of the above embodiments, the valves can be automatically controlled by a controller. For example, when the system detects that the processing chamber is properly pre-heated, the controller can open the valve to feed the processing chamber with the substance. The system may also monitor the amount of substance in the processing chamber and close the valve when sufficient amount of substance (e.g., about 3 lbs or less) is already in the processing chamber.

In some embodiments, the processing chamber includes a roasting chamber configured to roast the substance via heat application. In some embodiments, the substance is roasted via conductive heat application on the substance. In some embodiments, the substance is roasted via convective heat application on the substance. In some embodiments, the substance is roasted via both convective heat application and conductive heat application on the substance. In some embodiments, the substance is roasted via inductive heat application on the substance.

In some embodiments, the method 600 further includes generating a signal indicative of the temperature of the substance in the roasting chamber and adjusting at least one operation parameter of the roasting chamber based on the signal. In some embodiments, the operation parameter is adjusted to be compliant with the processing instructions. In some embodiments, the operation parameter includes the temperature of the substance. In some embodiments, the operation parameter includes the flow rate of hot air fed into the processing chamber.

The substance temperature can be measured or estimated in various ways. In some embodiments, a temperature sensor is positioned at an inlet of the roasting chamber to measure the temperature of the inlet air, which is indicative of the energy to be applied to the substance. In some embodiments, a temperature sensor is positioned in contact with the substance which is can be indicative of the substance temperature. In some embodiments, a temperature sensor is positioned at an outlet of the roasting chamber to measure the temperature of the exhaust air and the relationship of this air temperature to the substance temperature can also be indicative of the energy transferred to the substance. In some embodiments, a temperature sensor can be positioned inside the roasting chamber to measure the air temperature within the roasting chamber or measure the wall temperature of the roasting chamber.

In some embodiments, multiple sensors can be used. For example, one temperature sensor can be disposed near the inlet, one temperature sensor can be disposed at the outlet, and one or more temperature sensors can be disposed within the roasting chamber. The controller can collect signals from all temperature sensors and derive the accurate temperature of the substance.

In addition, the collection of the measurements by the temperature sensors can also be used for device diagnostics. For example, if temperature sensors do not achieve and/or record predetermined temperature set points during certain periods of the roast process, the system may determine that a fault condition is met, and notify a user of the system.

In some embodiments, a color sensor is employed to detect the color of the substance in the roasting chamber and the color can be indicative of the stage of roasting. The controller can then adjust the operation parameter(s) of the roasting chamber based on the detected color. In some embodiments, the color detector includes a laser. In some embodiments, the color detector includes a white light LED.

In some embodiments, both the color and temperature of the substance are monitored. The controller relies on the substance temperature to adjust the operation parameters during the early stage of the roasting and relies on the substance color to adjust the operation parameters during the later stages of the roasting. For example, the controller can rely on the substance color to control the roasting at the end of the roasting so as to achieve the desired finish color. The desired finish color can be based on numeric color values. For example, the color values could be based on the Specialty Coffee Association Roast Color Classification System ranging from very light to very dark. In some embodiments, for a given color value, more than one temperature-time profile can be used to achieve the given color value.

In some embodiments, the method 600 further includes measuring various environmental parameters, which can be used to adjust the processing instructions (or the roasting profiles). In some embodiments, the method 600 includes measuring the humidity in the environment surrounding the roasting device. In some embodiments, the method 600 includes measuring the location of the roasting device using, for example, a GPS, an atmospheric pressure sensor, or any other proper detectors. The location of the roasting device can include the altitude of the roasting device. The altitude information is then used by the controller to adjust the processing instructions (e.g., increasing the airflow as the altitude increases).

In some embodiments, the substance is disposed into the processing chamber manually by a user. For example, a user can scan the readable tag using an external device or a scanner mounted to the exterior surface/casing of the apparatus and then pours the substance into the processing chamber. The external device transmits the processing information in the tag to the controller for subsequent generation of processing instructions.

In some embodiments, an opener is used to open the container and deliver the substance from the container to the processing chamber (or the hopper, or the intermediate chamber, if applicable). In some embodiments, the opener includes a blade to slice open the container and the substance can move into the processing chamber under gravity force. In some embodiments, the opener includes a can opener. In some embodiments, the opener includes a sliding punch with cutting edge opener. In some embodiments, the opener includes an articulating barb flap opener.

In some embodiments, the method 600 further includes dispensing the substance after processing into a cooling tray and reducing the temperature of the substance using the cooling tray. The cooling of the substance can be achieved by, for example, air cooling. An agitator can also be used to agitate the cooling tray to increase the cooling rate. In some embodiments, the agitation is achieved using a vibratory motor, which vibrates the cooling tray and levels the roasted coffee to achieve even cooling. In some embodiments, the agitation is achieved using an agitator arm or a stirring arm to level and mix the roasted coffee to achieve even cooling. In some embodiments, a filter can be used together with the cooling tray to remove particles below a threshold size. The threshold size can be, for example, from about 0.1 mm to about 2 mm (e.g., about 0.1 mm, about 0.2 mm, about 0.3 mm, about 0.5 mm, about 1 mm, about 1.5 mm, or about 2 mm, including any values and sub ranges in between).

In some embodiments, the method further includes displaying, on a user interface, at least two processing modes to process the substance. The display is further configured to receive a selection from a user and the controller can adjust the processing instructions based on the user's selection. In some embodiments, the processing modes include desired roast levels of the substance after processing, such as type of coffee roast, light roast, medium roast, dark roast.

In some embodiments, the user interface includes a touch screen for both mode display and mode selection. In some embodiments, the user interface can be a tablet, a smartphone, a personal computer, or any other appropriate device. This device can be digitally connected to the controller and the user can conveniently control the operation of the roasting device from this device.

In some embodiments, the container is received by a receptacle having a mating mechanism to secure the container. In some embodiments, the mating mechanism includes a physical mating mechanism, such as a key-and-lock structure, to receive only certain type of containers. Once the correct container is in place, the system can detect the presence of the container using a sensor. In addition, a tag reader can be triggered to read the tag on the container and/or an opener can be triggered to open the container and dispense the substance in the container into the processing chamber.

In some embodiments, once the correct container is in place, a fully automated processing procedure is initiated. In this process, the container is opened by an opener and the substance is dispensed into the processing chamber automatically. The controller receives the processing information from a tag reader and then generates the processing instructions based on the processing information and additional processing information from the remote server. The processing chamber is pre-heated also upon the detection of the container in the receptacle. The controller then directs the processing chamber to process the substance in compliance with the processing instructions. The processed substance is then removed from the processing chamber and placed in a cooling tray for subsequent use (e.g., grinding of coffee).

In some embodiments, the controller saves processing information from each tag into a database and compares subsequent processing information with the database. If the current processing information was detected before, the controller then generates an alert signal to the user indicating possible reuse of the container. In some embodiments, the controller can lock the roasting device to block the substance from entering the processing chamber in response to detection of a reused container.

FIG. 7 illustrates a block diagram of a distributed system 700 for substance processing. The system 700 includes a plurality of roasting devices 720*a*, 702*b*, and 702*c*, each of which includes a respective receptacle (722*a*/722*b*/722*c*) configured to receive a container. In some embodiments, each of the roasting devices 720*a*, 720*b*, and 720*c* can be structurally and/or functionally similar to the apparatus 100 shown in FIG. 1 and described above. The container includes the substance for processing and further includes a tag having processing information. Each device (720*a*/720*b*/720*c*) also includes a respective tag reader (724*a*/724*b*/724*c*) configured to read the processing information from the tag on the container and a respective processing chamber (726*a*/726*b*/726*c*) to process the substance.

The system 700 also includes a computing device 710 (also sometimes referred to as a central server 710), which in turn includes a memory 712 configured to store a plurality of roasting instructions. Each roasting instruction has corresponding processing information associated therewith. The computing device 710 also includes a communication interface 716 operably coupled to the memory 712 and a processor 714 operably coupled to the memory 712 and the communication interface 716. The processor 714 is configured to execute executable instructions to receive the processing attributes via the communication interface 716 from at least one roasting device (720*a*, 720*b*, and/or 720*c*). The processor 714 then retrieves the roasting instruction corresponding to the processing attributes from the memory 712 and controls the communication interface 716 to transmit that roasting instruction to the at least one roasting device (720a. 720b, and/or 720c).

In some embodiments, the communication interface 716 of the computing device 710 includes a digital communication interface, such as a wireless interface. Accordingly, the communication between the computing device 710 and the roasting devices 720a, 720b, and 720c can be achieved via wireless connection. In some embodiments, the computing device 710 can include a cloud server.

In some embodiments, the computing device 710 is in communication with a master roasting device (not shown) operated by an entity such as a roastmaster, or another separate device. For each lot of green coffee, the roastmaster takes out a sample and roasts the sample using the master roasting device, producing a roasting profile for the lot of coffee. During the test roasting, the operation parameter(s) of the master roasting device can be recorded by the computing device 710 and used for generating the roasting profile. In some embodiments, the operation parameter includes the temperature profile as a function of time. In some embodiments, the operation parameter(s) can also be transmitted to the computing device 710 and can be made available for users to retrieve and download to their own roasting devices (720a, 720b, and 720c) to customize their roasting. In some embodiments, each roasting device 720a, 720b, and 720c can transmit its respective roasting Logs to the computing device 710, which can make the Logs available for other users to use.

In some embodiments, the computing device 710 is configured to generate at least part of the roasting profile. For example, the processor 714 can receive at least one attribute of green coffee being roasted in the master coffee roaster and generate a roasting instruction based on the attribute of the green coffee. The attribute of the green coffee can include, for example, origin, weight, harvesting time, and/or the variety of the green coffee.

In some embodiments, the communication interface 716 of the computing device 710 can receive operation parameters from the roasting devices 720a, 720b, and/or 720c. The processor 714 then saves the operation parameters into the memory 712 and generates one or more roasting instructions based at least in part on the operation parameters. In this manner, users can participate in the process of generating the roasting profiles.

In some embodiments, in addition to operation parameters, users can also transmit other information to the computing device 710. For example, users can upload users' comments about the green coffee, the roasting process, and/or the roasted coffee. These comments can be considered by the roastmaster when evaluating the roasting profiles.

In some embodiments, the computing device 710 is in real-time communication with the roasting device 720a, 720b, and 720c. In some embodiments, the processor 714 receives at least one environmental parameter from a roasting device 720a, 720b, or 720c, generates a new roasting instruction based at least in part on the environmental parameter, and then transmits the new roasting instruction back to the sending device to instruct the roasting. In this way, users can acquire real-time instruction from the computing device 710. In some embodiments, the environmental parameter includes at least one of a room temperature, a humidity, or the geographic location of the roasting device.

FIGS. 8A-8D illustrate a compact roaster 800 that can be used for roasting green coffee or other suitable products. The roaster 800 includes a receptacle 810 configured to receive a coffee package containing green coffee, a roasting chamber 820 to roast the green coffee, and an output port 830 to release the roasted coffee to a cooling tray 840. The receptacle 810, the roasting chamber 820, and the cooling tray 840 collectively define a common axis 801. In such instances, the green coffee beans can move to the roasting chamber 820 from the receptacle 810 via force of gravity (once the consumable/coffee package is opened). The roasted coffee can also move to the cooling tray 840 under gravity force. This configuration can also increase the compactness of the roaster 800, allowing convenient use in a wide range of environments, such as retailer stores, home kitchens, and offices.

A window 825 (also sometimes referred to as a sightglass 825) is included on the roasting chamber 820 and can allow a user to visually monitor the roasting process by observing, for example, the color of the coffee beans in the roasting chamber 820. Alternatively or additionally, color sensors can be used to monitor the roasting process. A mesh grill pattern 870 is applied on the surfaces of the compact roaster 800 and can be configured for ventilation. The top of the compact roaster 800 can also include a mesh grill pattern 822 as shown in FIG. 8D to provide additional ventilation.

A handle 880 (also referred to as a lever 880) is disposed below the receptacle 810 to control the operation of the roaster 800. In some embodiments, the handle 880 can be used to initiate a fully automated roasting process. For example, a user can pull the handle toward themselves (see, e.g., arrow A1 in FIGS. 8D, and FIGS. 10A and 10B) and start the roasting process. In some embodiments, the handle 880 can be used to secure the coffee package in the receptacle 810 and/or turn on an opener configured to open the coffee package.

The roaster 800 also includes a base section 850 to support the receptacle 810, the roasting chamber 820, and the cooling tray 840. The base section 850 can also be configured to contain electronic components, such as processor, memory, and communication interface, among others. In addition, the wall of the base section 850 can also include several indicators 852 and 854. For example, the first indicator 852 can be used to display the temperature of the coffee beans within the roasting chamber. The second indicator 854 can include three LED lights showing the status of the roaster 800. For example, the indicator 854 can show that the roaster is "Roasting In Process," "Cooling In Process," and "Roasting Completed" using the three LED lights. Any other arrangements of the LED lights can also be used. The wall of the base section 850 can also include a power button 856 that can be configured as the main power switch of the roaster. A green light shown on the power switch 856 can indicate that the roaster 800 is powered on. In some embodiments, additional indicators may be used to alert a user of errors by displaying a red light. The roaster 800 also includes four legs 860 to support the roaster 800.

In FIGS. 8A-8D, the cross section of the receptacle 810 has a rectangular shape. Accordingly, the cross section of the coffee package can also have a rectangular shape, i.e., the coffee package/consumable can have a cuboid shape. In some embodiments, the cross section can have other shapes, such as round, elliptical, square, or any other suitable shape.

In some embodiments, the roaster 800 can be configured to operate in an ambient temperature from about 4° C. to about 40° C. In some embodiments, altitude information of the roaster 800 can be entered upon installation through the communication interface. The altitude information can be used to determine and/or adjust the roast profile. Alternatively, a GPS receiver can be used to determine the location of the roaster 800.

In some embodiments, the roaster 800 can include one or more communication interfaces to connect the roaster 800 to the Internet. In some embodiments, a RJ45 connector can be used for direct Ethernet connection. In some embodiments, a Wi-Fi interface can be included to connect the roaster 800 to the Internet via wireless connections. In some embodiments, the roaster 800 can include a Bluetooth interface, which can be used for mobile App setting of roaster profiles.

In some embodiments, base section 850 (or any other sections of the roaster 800) can be configured for various types of displays and indicators. In some embodiments, the roaster 800 can include an indicator (e.g., an LED light) to show that the consumable is loaded and ready for processing. For example, a red color from the LED light can indicate error (e.g., because of reused container or other inappropriate containers), a yellow color can indicate that the roaster 800 is scanning the tag on the consumable and setting roasting profiles, and a blinking green light can indicate that the it is ready to begin roasting.

In some embodiments, the roaster 800 can include an indicator to display the status of roasting. For example, a red light can indicate error, a yellow light can indicate that the roasting chamber 820 is under pre-heating, and a green light can indicate that the roasting chamber 820 is functioning properly.

In some embodiments, the roaster 800 can include an indicator to display the status of cooling. For example, a red light can indicate error, a green light can indicate that the cooling is under progress, and a blue light can indicate that the cooling is done and the roasted coffee beans can be removed for further processing, such as grinding.

In some embodiments, the roaster 800 can allow various user control inputs. In some embodiments, a user can pull down the lever 880 to trigger the roaster 800 to open the consumable and start roasting. In some embodiments, a user can push down the lever 880 to set the roaster 800 into a maintenance mode from idle, allowing opening of front panel to service roast chamber 820. In some embodiments, a user can push an emergency stop button to shut down power instantly. In some embodiments, a user can use a mobile app for choosing roasting profiles and quantities for inventory management.

The roaster 800 can include various types of sensors to monitor the roasting process. In some embodiments, the roaster 800 includes a bean temperature sensor to measure the coffee bean temperature. The sensor can be placed within the roasting chamber 820 to be fully immersed in the bean mass and out of the influence of the airflow. In some embodiments, the roaster 800 can include blower intake temperature sensor configured for measuring ambient temperature at intake of the roaster 800. In some embodiments, the roaster 800 can include a heater inlet temperature sensor configured for measuring heater inlet temperature. In some embodiments, the roaster 800 includes a heater outlet temperature sensor configured for measuring heater outlet temperature.

In some embodiments, the roaster 800 can include an exhaust temperature sensor located in the exhaust flow at the chamber exhaust port and configured for measuring the exhaust temperature. In some embodiments, the roaster 800 can include a roasting chamber inlet temperature sensor configured for measuring the inlet air temperature with minimal flow interference. In some embodiments, the roaster 800 can include a cooling tray temperature sensor configured for measuring cooling tray temperature. In some embodiments, the roaster 800 can include an ambient air temperature sensor configured for measuring ambient temperature.

In some embodiments, the roaster 800 can include a sensor to detect the presence of a consumable. The sensor can include, for example, a through-beam sensor or a reflective sensor. In some embodiments, the roaster 800 can include a sensor to detect the presence (or the absence) of the cooling tray 840. The sensor can use light transmission or reflection for the detection. In some embodiments, the roaster 800 can include a sensor to measure the cooling tray level (e.g., weight of roasted beans in the cooling tray).

In some embodiments, the roaster 800 can include a sensor to detect the presence of the absence of a chaff collector to ensure the chaff collector is ready to receive chaff. Coffee chaff is the dried skin on a coffee bean and usually comes off during the roasting process. The chaff is usually much lighter than the coffee beans such that it may spread around the roasting system and interfere with the normal operation of the roasting system. In some embodiments, the roaster 800 can include a sensor to measure the chaff collector level (e.g., whether the collector needs to be emptied). In some embodiments, the chaff collector can include a cyclonic separator to separate the chaff from the coffee beans.

In some embodiments, the roaster 800 can include a sensor to detect whether the front panel of the roaster 800 is open. In some embodiments, the roaster 800 can include a sensor to detect whether the back panel of the roaster 800 is open. In some embodiments, the roaster 800 can include one or more pressure sensors to detect system leaks and blockages.

In some embodiments, the roaster 800 can be configured to fit and stand stably on a typical café counter, i.e. a counter-top coffee roaster. For example, the dimensions of the roaster 800 can be about 30 inches (Width)×24 inches (Height)×22 inches (Depth) or less. In some embodiments, the weight of the roaster 800 (without coffee green) can be about 200 lbs or less (e.g., about 200 lbs, about 175 lbs, about 150 lbs, about 125 lbs, about 100 lbs, or less, including any values and sub ranges in between).

The output system in the roaster 800 includes the output port 830 and the cooling tray 840. This system is configured to perform one or more of the following functions, including receiving hot roasted coffee beans discharged from the roasting chamber 820, cooling the roasted coffee beans in the cooling tray 840, drawing away smoke emitted by the roasted coffee beans, agitating the roasted coffee to settle the bean level, filter out unwanted particulates (principally chaff) with a serviceable filter and routing smoke/exhaust fumes into main roaster exhaust.

In some embodiments, the cooling tray 840 is configured to hold at least 680 grams of roasted coffee beans, which is usually the standard batch size. Accordingly, the consumable fed into the receptacle 810 can include green coffee that is expected to yield about 680 g of roasted coffee. In some embodiments, the volume of the cooling tray 840 can be about 2000 mL or greater. In some embodiments, the cooling tray 840 is configured to reduce or avoid spilling of roasted coffee beans when the roasted coffee beans are dumped into the cooling tray 840. In some embodiments, during discharge, the roasting chamber 820 can be pressurized, and the coffee beans may be ejected with more force than just gravity. Accordingly, the cooling tray 840 can be configured to have a larger size to receive the roasted coffee beans. In some embodiments, the cooling tray 840 is configured to withstand regular exposure to roasted coffee beans with a surface temperature of about 230° C. or more.

In some embodiments, the cooling tray 840 is configured to cool down the roasted coffee beans evenly from about 230° C. to ambient room temperature in about 4 minutes or less (e.g., about 4 minutes, about 3 minutes, about 2 minutes, or less, including any values and sub ranges in between). In some embodiments, the roaster 800 can include a blower to facilitate the cooling via forced air convection. In some embodiments, the roaster 800 can include a stirring arm or paddle to agitate the cooling tray 840. In some embodiments, the roaster 800 can include a vibratory motor to agitate the cooling tray 840 when small batch sizes are used (e.g., about 2 lbs or less). In some embodiments, an agitator arm or a stirring arm can be used to level and mix the roasted coffee to achieve even cooling of the substance. In some embodiments, the removable cooling tray is designed to facilitate pouring the roasted coffee beans into another container. For instance, in some embodiments the cooling tray may include a spout. In some embodiments, the cooling tray may have a handle. In some embodiments, the cooling tray may have finger grips.

FIGS. 9A and 9B illustrate two cooling trays that can be used in the roaster 800 shown in FIGS. SA-SD. FIG. 9A illustrates a cooling tray 1101 including a side wall 1111 and a filter 1121 formed at the bottom of the tray 1101. The side wall 1111 is made of an opaque material, such as a metal, ceramic, plastic, etc. FIG. 9B illustrates a cooling tray 1102 including a side wall 1112 and a filter 1122 formed at the bottom of the tray 1102. The side wall 1112 is made of a transparent material, such as glass, plastic, or polymer, among others. The side wall is designed with three rounded corners and one pointed corner. The pointed corner can function as a spout that facilitates pouring the roasted beans into another container. In FIGS. 9A and 9B, the filters 1121 and 1122 are configured to remove particles having dimensions less than a pre-determined values while the cooling air is drawn through the cooling tray. In some embodiments, the filters 1121 and 1122 can be configured to remove particles in the range from about 0.1 mm to about 1 mm.

FIGS. 10A and 10B illustrate a coffee roasting system 1200 including a mechanism to open consumables 1220 within a roaster 1210. In FIG. 10A, the consumable 1220 is ready to be placed into a receptacle 1215 of the roaster 1210, which can be substantially identical to the roaster 800 shown in FIGS. 8A-8D and detailed descriptions are not repeated here. In FIG. 10B, the consumable 1220 is positioned in the receptacle. The shape and dimensions of the consumable 1220 are configured to fit the shape and dimensions of the receptacle 1215, such that when the consumable 1220 is placed into the receptacle 1215, the consumable 1220 is secured and held by the receptacle 1215. The roaster 1210 also includes an opener (see FIGS. 13A-17C) operably coupled to the receptacle 1215 and configured to open the consumable 1220 when it is received by the receptacle 1215.

Figure 11A:
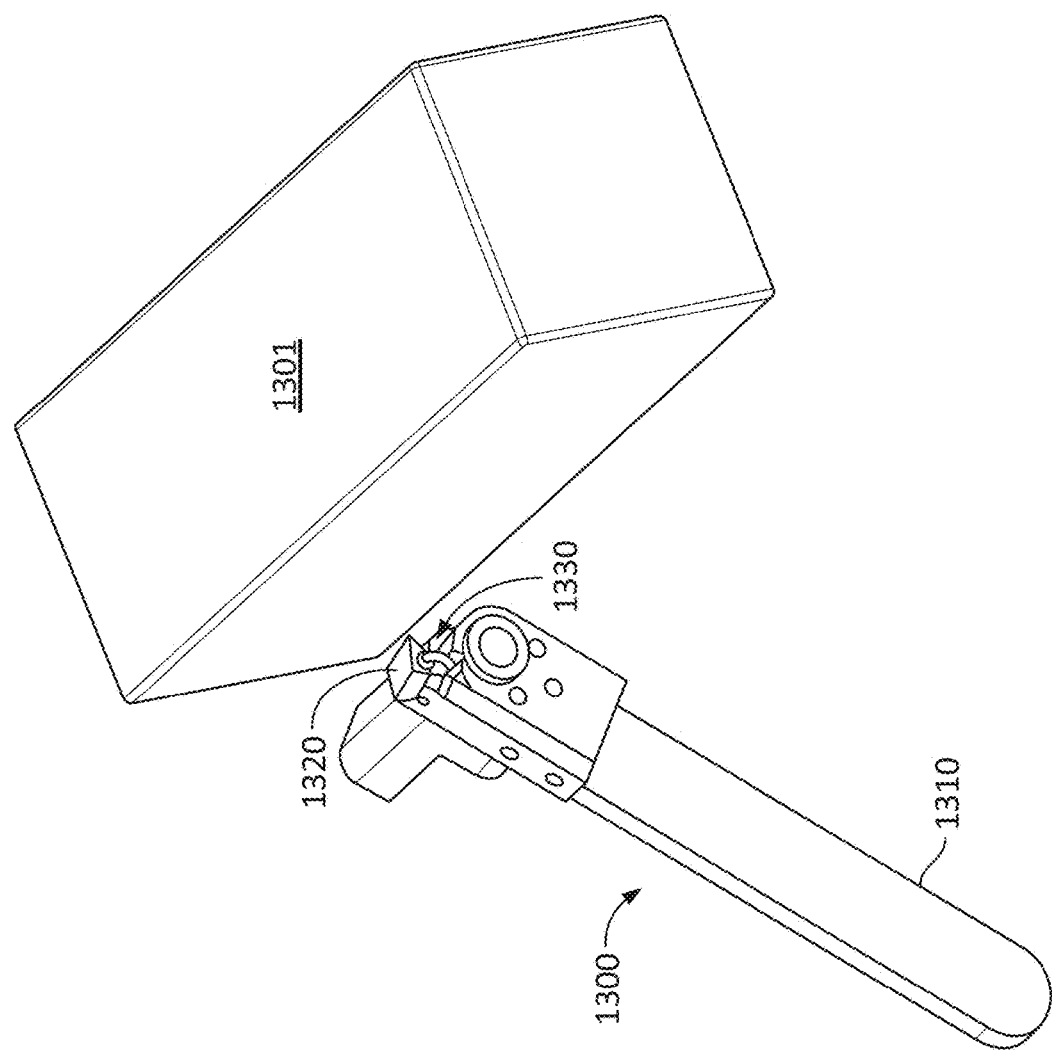
FIGS. 11A-11C illustrate an opener design useful for opening consumables, according to embodiments.
Figure 11C:
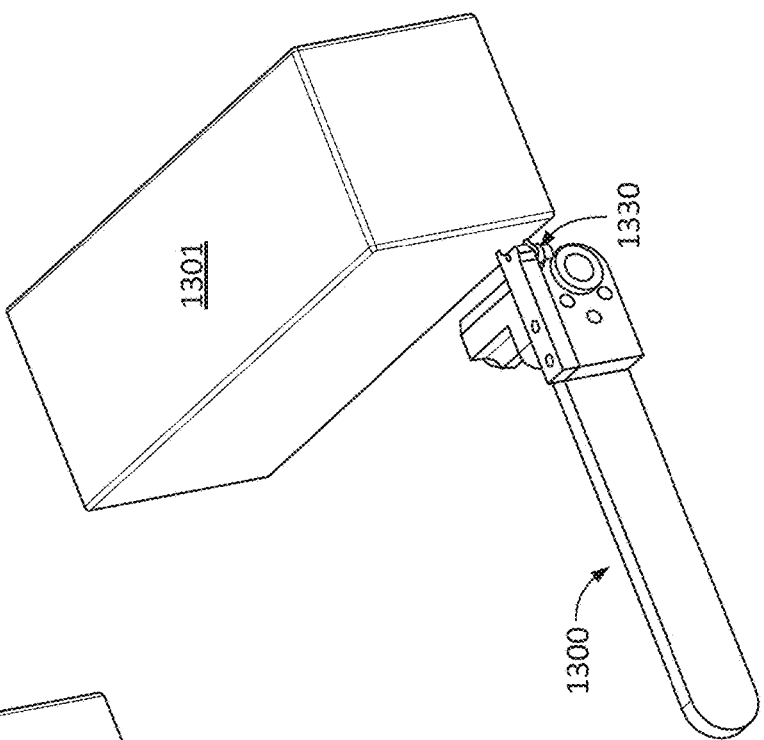
Figure 11B:
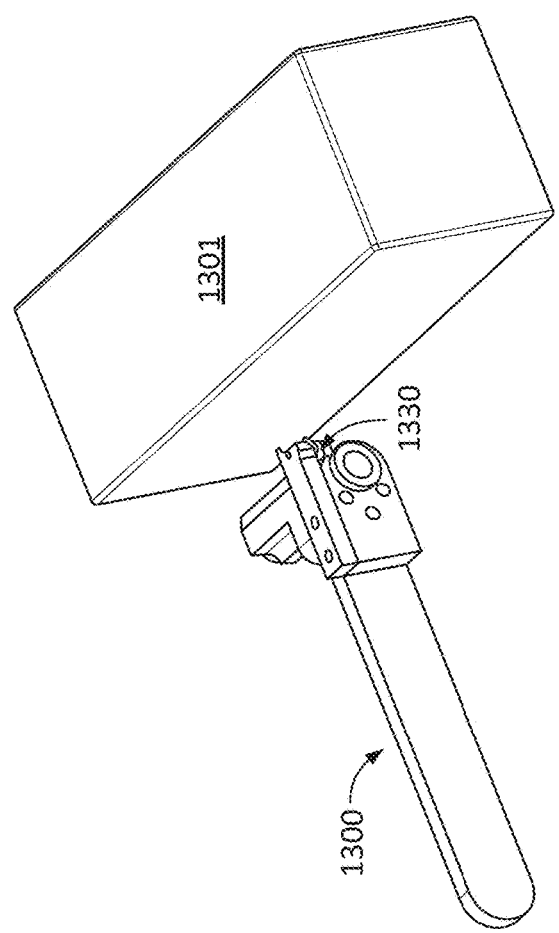
Figure 12A:
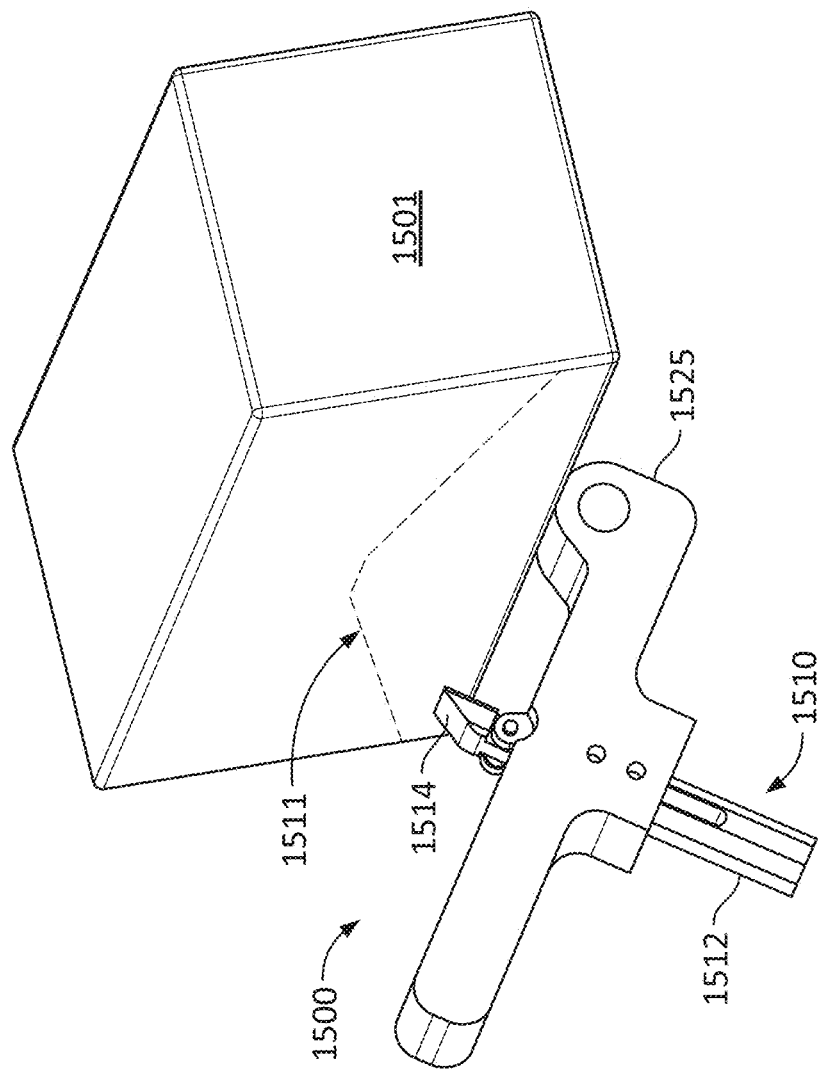
FIGS. 12A-12D illustrate a trash bag opener used for opening consumables, according to other embodiments.
Figure 12B:
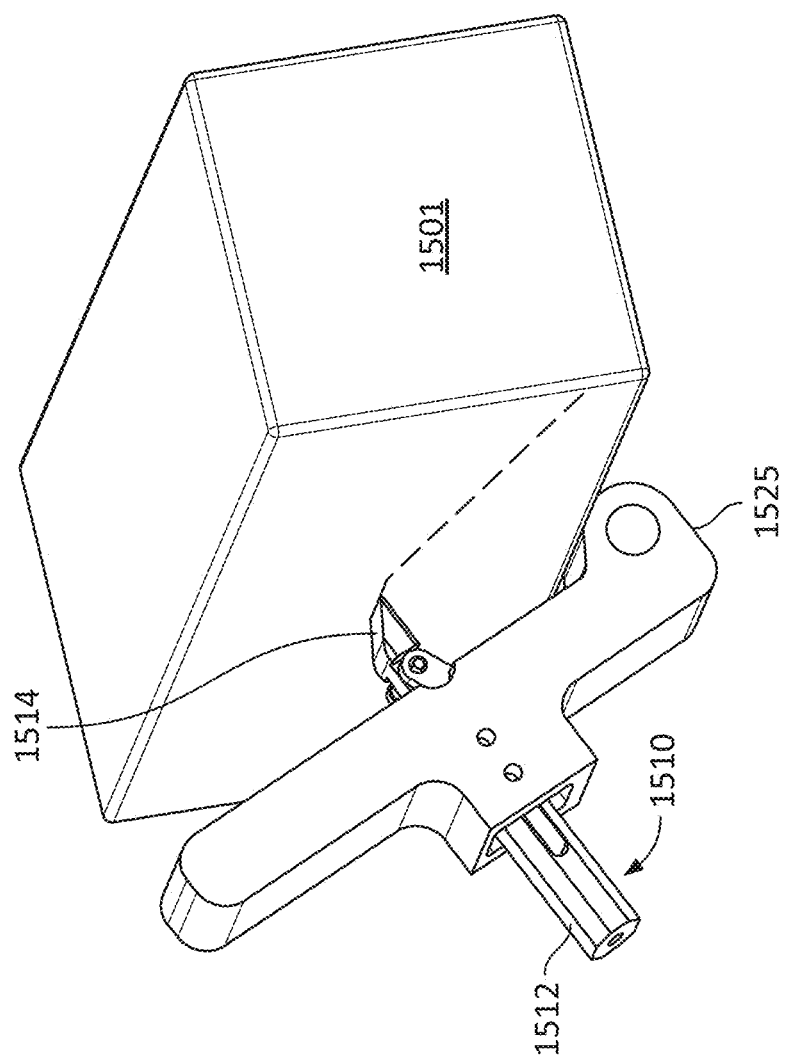
Figure 12C:
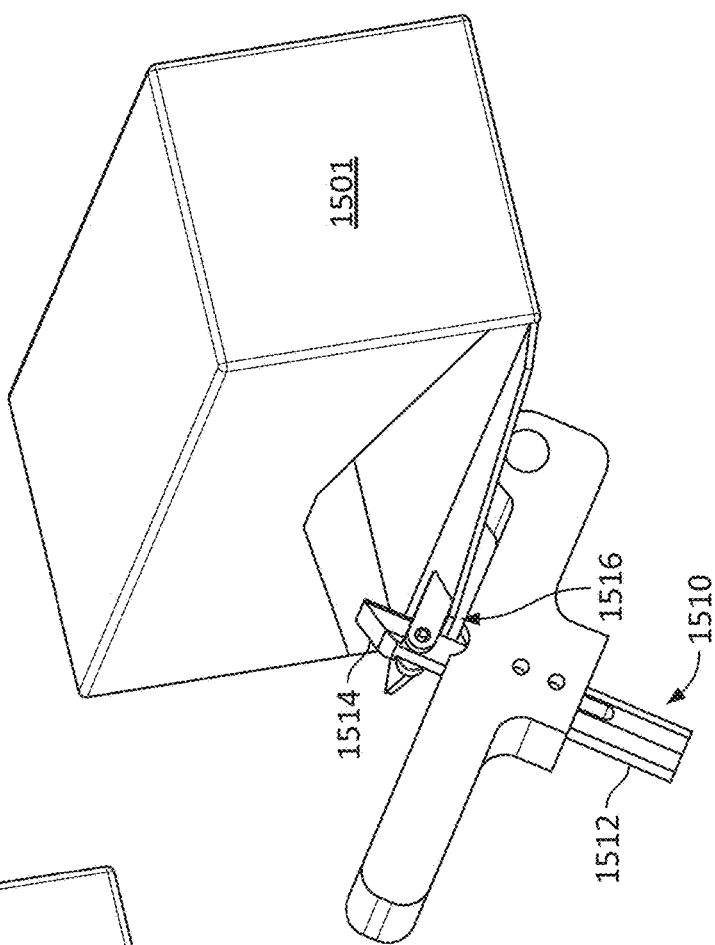
Figure 12D:
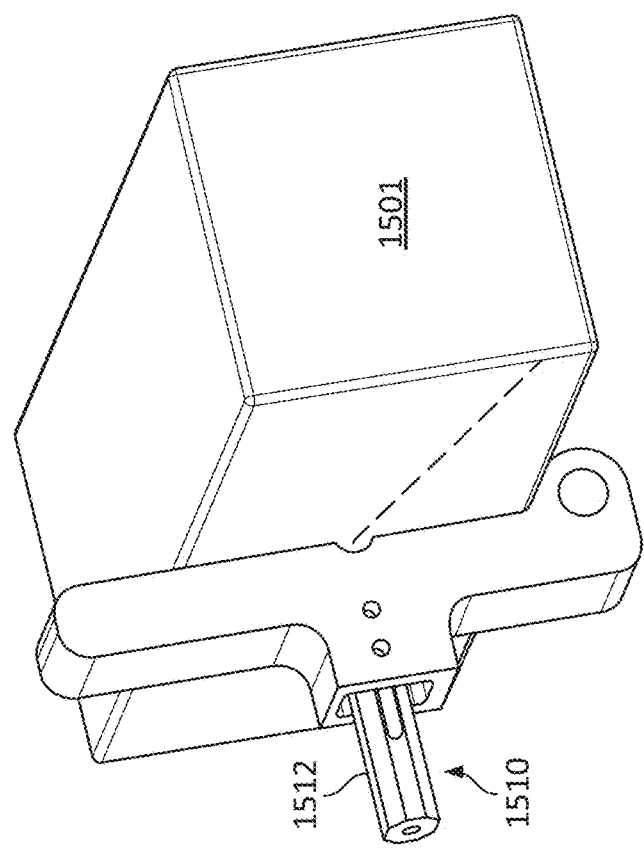

FIGS. 11A-11C illustrate a can opener 1300 using a sliding punch with cutting wheel mechanism. The can opener 1300 is used for automatically opening consumables 1301. The can opener 1300 includes a lever 1310 and a punch 1320 disposed at the tip of the lever 1310. In operation, the punch 1320 is rotated to break open a corner of the consumable 1301 as illustrated in FIGS. 11A and 11B. The lever 1310 then slides along the edge of the consumable 1301 and cuts open the entire bottom edge (shown in FIG. 11C) using the cutting wheel 1330. The green coffee in the consumable 1301 is dispensed through the cut edge by gravity.

FIGS. 12A-12D illustrates an opener 1500 for automatically opening a box 1501 with a perforated flap opening 1511. The opener 1500 includes a lever 1525 with a cross mounted plunger assembly 1510. The cross mounted plunger assembly 1510 has a blunt tip 1514 disposed at the distal end of a handle 1512. The blunt tip 1514 pierces the apex of the box perforation 1511 when the lever 1525 is rotated toward the box 1501. The cross mounted plunger assembly 1510 is subsequently pushed forward, which drives an articulating barb 1516 down (shown in FIG. 12D), trapping the box flap between the articulating barb 1516 and lever 1525. The box flap is opened and the green coffee is released as the lever 1525 rotates away from the face of the box 1501.

Figure 13A:
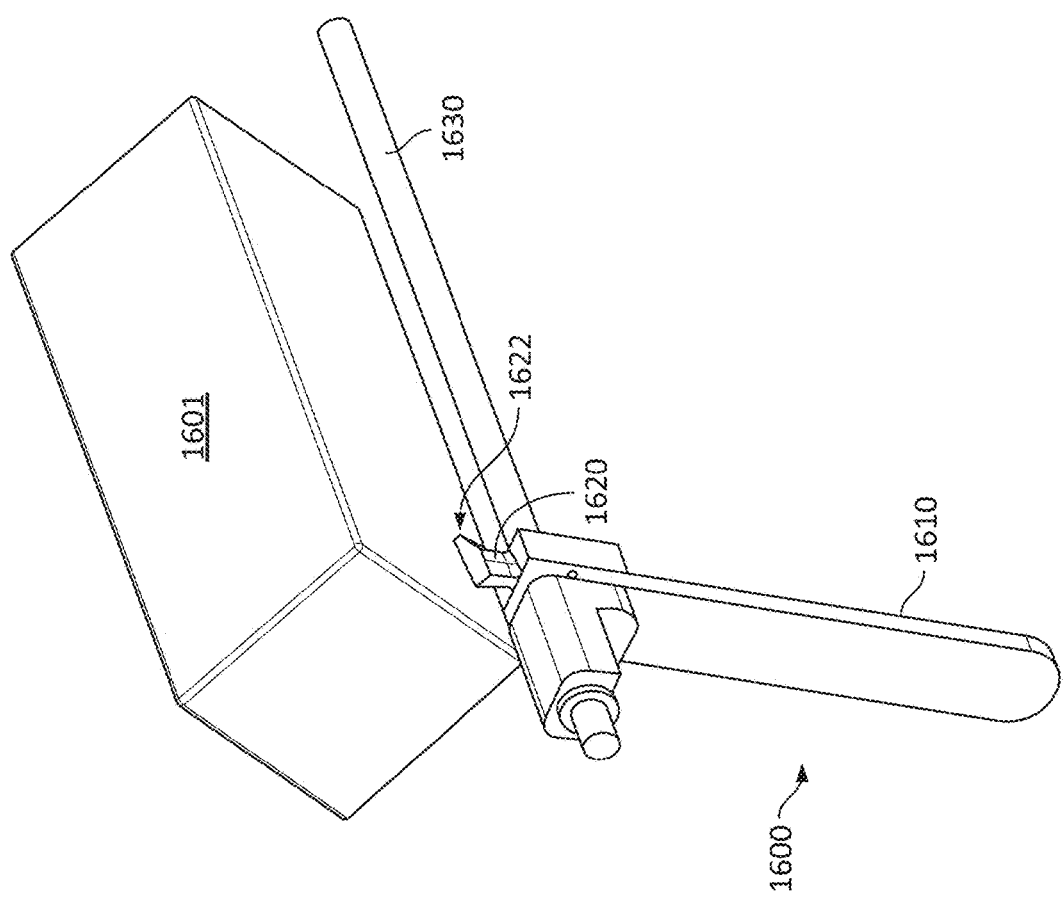
FIGS. 13A-13D illustrate a consumable opener, according to other embodiments.
Figure 13B:
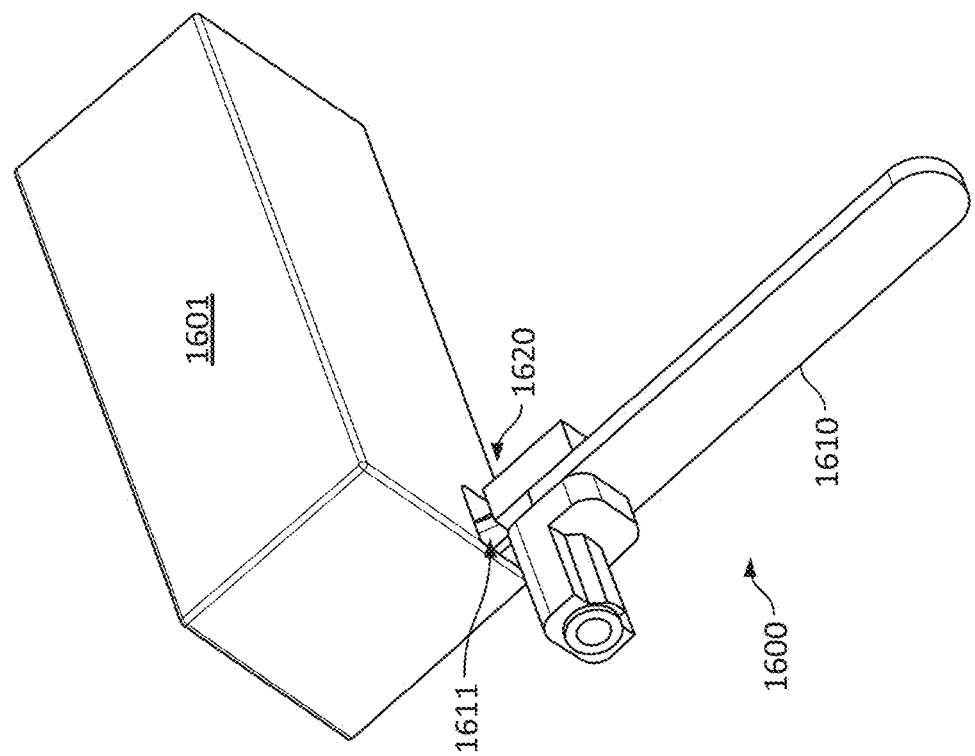
Figure 13D:
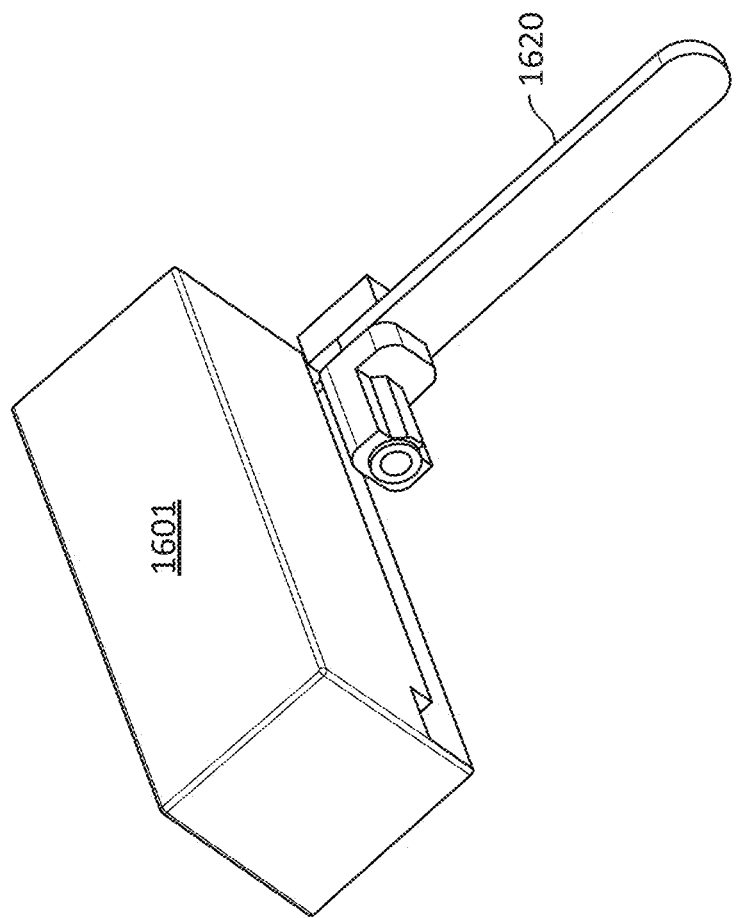
Figure 13C:
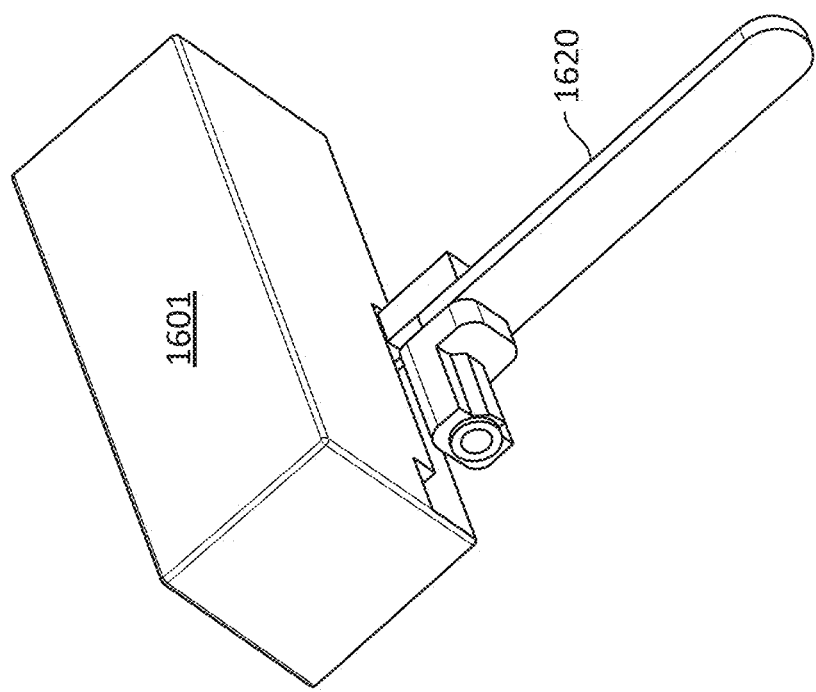

FIGS. 13A-13D illustrates an opener 1600 using a sliding punch with a cutting edge according to embodiments. The opener 1600 is also referred to a Church Key 1600. The Church Key 1600 includes a lever 1610 and a punch 1620 disposed at one end of the lever 1610. The Church key rotates around and slides on a shaft 1630 as shown in FIG. 13A. One edge of the punch has a cutting edge 1622. In operation, the punch 1620 is rotated through the corner of a consumable 1601 by rotating the lever 1610 around shaft 1630. The punch 1620 cuts open a small opening 1611 in the consumable 1601, as shown in FIG. 13B. The cutting edge 1622 of the Church Key 1600 then cuts along the bottom edge of the consumable so as to open the entire edge as shown in FIGS. 13C and 13D. The green coffee dispenses from the consumable by gravity along the cut edge.

FIG. 17 is a block diagram of a roaster 1700 which may be structurally and/or functionally similar to any of the roasters described in detail herein. During use, the roaster 1700 may include an air path 1702 and a bean path 1704 through the system 1700. For example, air may enter an inlet 1710 of an air intake filter 1720. The air intake filter 1720 may be coupled to a blower 1730 that pressurizes the ambient air. The blower 1730 may be coupled to a heat exchanger 1740, which may be configured to receive the pressurized ambient air from an outlet of the blower 1730. The heat exchanger 1740 may be coupled to a heater 1750 and a catalytic oxidizer 1780. The heat exchanger 1740 may be further configured to receive heated air from the catalytic oxidizer 1780. The heated air and ambient air may mix within the heat exchanger 1740 and may be output either from the first heater 1750 or from the exhaust 1742. The heat exchanger 1740 may be configured to modulate the temperature and flow rate of air output to the roast chamber 1760. The first heater 1750 may be coupled to the roast chamber 1760 and may be configured to heat and/or pressurize the air received from the heat exchanger 1740. The first heater 1750 may output air into the roast chamber 1760 via a nozzle such as described in more detail herein.

A consumable, such as a container 1706 of beans, may be loaded 1706 into the system 1700. The contents of the container 1706 may be input into the roast chamber 1760 at a predetermined time (e.g., 10 minutes per 2 lb. batch) during the roasting process. When roasting of the beans has been completed, the beans may be output from the roast chamber 1760 for cooling on a tray 1790, for example. Returning to the air path 1702, heated air may be output from the roast chamber 1760 to a cyclonic separator 1770 configured to separate the chaff from the beans and then to a second heater 1752. The second heater 1752 may be configured to increase air temperature (e.g., between about 650° F. and about 700° F.) for catalysis in the catalytic oxidizer 1780. An output of the second heater 1752 may be coupled to an input of a catalytic oxidizer 1780. Accordingly, heated air within the roaster 1700 may be reused so as to reduce energy consumption and the exhaust of heated air into the ambient environment.

Figure 14A:
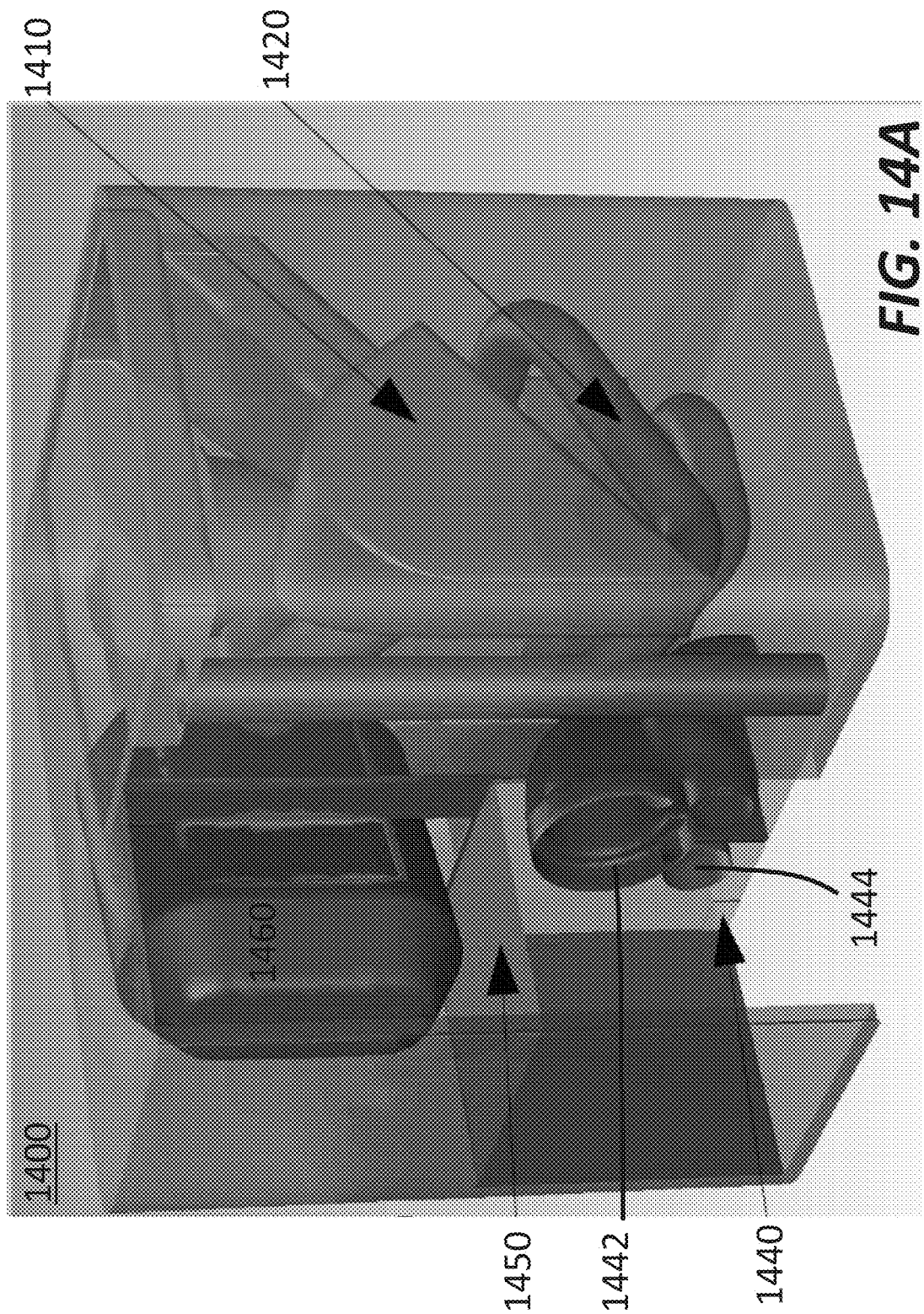
FIG. 14A illustrates a perspective view of a compact roaster, according to embodiments.

FIGS. 14A-14B illustrate a compact roaster 1400 that can be used for roasting green coffee or other suitable substances. As shown in FIG. 14A, the roaster 1400 may include a roasting chamber 1410 configured to roast green coffee and a nozzle 1420 coupled to the roasting chamber 1410. The nozzle 1420 may be configured to provide pressurized and heated air to the roasting chamber 1410 at a predetermined flow rate and temperature as described in detail herein. The nozzle 1420 may be coupled to a heat exchanger 1430 as shown in FIG. 14B. The heat exchanger 1430 may be coupled to a blower 1450 and a catalytic oxidizer 1460, and may be configured for heat recovery where hot air from the roasting chamber may be reused and directed back into the catalytic oxidizer, thereby reducing power consumption. Generally, the nozzle 1420 may be configured to precisely modulate the air temperature for a roast process such that most of the energy added to the ambient air is provided by the heat exchanger, and not by the nozzle. The heat exchanger 1430 may be a passive component (e.g., stainless steel cross-flow) configured to receive heated airflow from the catalytic oxidizer 1420 and blower 1450. The heat exchanger 1430 and blower 1450 may be coupled via a set of inlets 1440 including a blower inlet 1442 and cooling inlet 1444. In some embodiments, the catalytic oxidizer 1420 may be configured to receiver exhaust from the chamber 1410 and increase the air temperature to between about 650° F. and about 700° F. In some other embodiments, the heat exchanger 1430 may be an active component such as a rotary heat exchanger.

The nozzle 1420 as described herein may improve the efficiency of heated airflow into a roasting chamber such that a smaller blower may be used that may (in turn) use less energy, and which may aid in minimizing the physical size of a compact, benchtop roaster. It should be appreciated that without considering the presence of beans (or other substances) within the roasting chamber, about 95% of pressure losses occur at the nozzle such that flow performance largely depends on nozzle design.

FIG. 15A illustrates a perspective view of a roasting chamber 1510 coupled to an outlet 1520 and a nozzle 1530. As best illustrated in FIG. 15B, the cross-sectional area of the nozzle 1530 may decrease from a proximal end 1532 to distal end 1534 of the nozzle 1530. The nozzle 1530 may include a nozzle exhaust 1540 at a distal end. The nozzle 1530 may gradually transition from a proximal portion having a circular cross-section to a distal portion (e.g., nozzle exhaust 1540) having a rectangular cross-section. In some embodiments, the transition from a circular cross-section to rectangular cross-section may occur across the entire length of the nozzle. In some embodiments, the distal end of the nozzle 1530 may have a diameter of between about 1 inch and 3 inches. The diameter at the distal end of the nozzle 1530 may be about 2 inches.

In some embodiments, a roaster may include a cyclonic separator configured to remove a chaff of a coffee bean. In some of these embodiments, a longitudinal axis of the cyclonic separator may be substantially parallel to ground (e.g., a horizontal plane) during use. The cyclonic separator may be coupled to a catalytic oxidizer as described herein such that air may flow from the cyclonic separator to the catalytic oxidizer.

In some embodiments, the nozzle exhaust 1540 may have a curve of between about 90° and about 135° configured to promote Görtler vortices such that high speed hot air output from nozzle exhaust 1540 may uniform (e.g., even pressure distribution) as it enters into a roasting chamber 1510, Görtler vortices are secondary flows that may appear in boundary layer flow along a concave wall. The nozzle 1530 may reduce recirculation of air and allow for more uniform lofting of the beans along a length of the nozzle 1530. For example, Görtler vortices may be generated along the lateral sides of the nozzle exhaust 1540 and may energize airflow in those regions to increase mixing and reduce friction with the walls of the nozzle exhaust 1540 so as to better match airflow characteristics of a central portion of the nozzle exhaust 1540. That is, airflow within the nozzle 1530 may be accelerated monotonously without regions of separation or recirculation. Furthermore, the curved shape of the nozzle exhaust 1540 may reduce "dead zones" and promote mixing of air near the side walls of the roasting chamber 1510. The shape of the nozzle as described herein may also allow the roaster to be more compact and allow miniaturization relative to a linear nozzle that would create a larger footprint and/or casing. FIG. 15C illustrates a cross-sectional view and provides an example set of dimensions of the nozzle 1530, nozzle exhaust 1540, and roasting chamber 1510.

FIG. 16 is an illustrative plot (1600) of flow rate and pressure drop where an operating envelope 1620 is defined by the intersection of a chamber resistance curve 1610 with a blower performance curve 1630. For example, the nozzle provides a flow rate at the points defined by operating envelope 1620 along the chamber resistance curve 1610 corresponding to the strength of the blower as defined by the blower performance curves 1630.

Figures 18C, 18D:
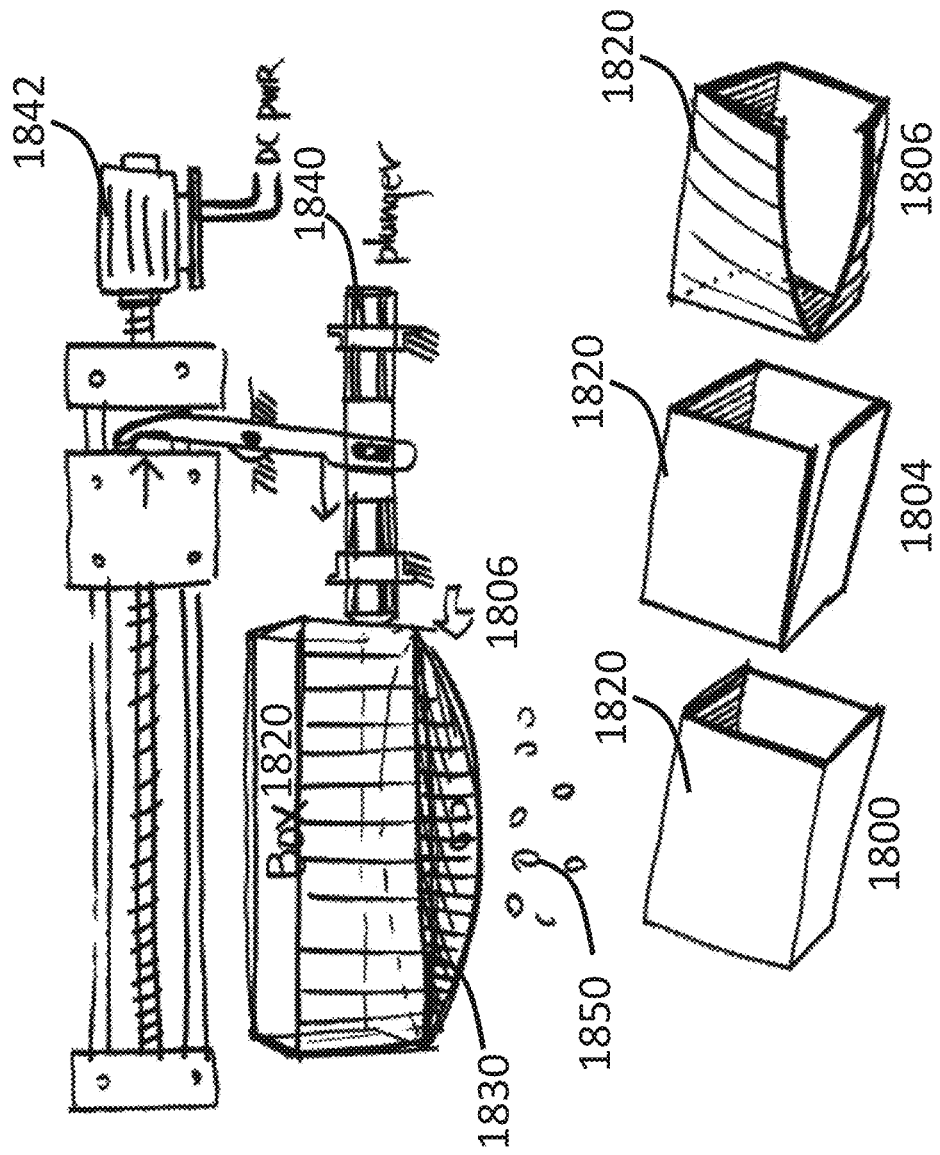

FIGS. 18A-18G illustrate methods of opening a consumable container 1820. In some embodiments, a consumable container 1820 may include a tag (not shown). The tag (e.g., bar code, QR code, RFID tag, and/or any other appropriate identifier) may be read by a tag reader (not shown) that may generate processing instructions based on the processing information contained within the tag. The processing instructions may include instructions and/or authorization to open the container 1820. In FIG. 18A, the system may be configured to form a cut 1802 in a container 1820 using a container opener 1810 (e.g., blade, knife, cutter, edge, protrusion, opener). The container opener 1820 may move relative to a stationary container 1820 (using a linear actuator) or the container 1820 may move relative to a stationary container opener 1820 such as through user insertion.

As illustrated in FIG. 18B, the container opener 1810 may be configured to create at step 1804 an opening 1830 in the container 1820. For example, the opening 1830 may extend along a length of a longitudinal edge formed by two side walls of the container 1820. In other embodiments, the opening 1830 may be any suitable shape and dimension. For example, the opening 1830 may have a shape such as circle, polygon, C-shape, V-shape, zig-zag pattern, combinations thereof, and the like. The opening 1830 may include any number of openings that are disposed in any manner such as parallel, intersecting, perpendicular, and/or angled relative to each other, combinations thereof, and the like. The opening 1830 may be disposed on one or more of an edge, bottom surface, and side walls of the container 1820.

FIG. 18C illustrates a plunger 1840 configured to contact at step 1806 a container 1820 having an opening 1830 in order to expand the size of the opening 1830 and urge the contents 1850 (e.g., coffee beans) of the container 1820 to fall out of the opening 1830. The process of deforming the container 1820 repeatedly may agitate the contents 1850 of the container 1820 efficiently to remove substantially all of the contents 1850. The plunger 1840 may be coupled to an actuator 1842 (e.g., linear actuator) that may be configured to advance the plunger 1840 to contact and deform 1806 the container 1820 such that the opening 1830 may expand (e.g., one or more sides of the container 1820 bulge out). In some cases, retraction of the plunger 1840 may allow the container 1820 to return substantially to its previous shape and reduce the size of the opening 1830. In some embodiments, advancement and retraction of the plunger 1840 may be repeated until substantially all of the contents of the container 1810 are removed (e.g., fall out due to gravity) from the container 1820.

In some embodiments, a set of plungers 1840 (not shown) may contact and deform at step 1806 one or more sides of the box 1820. The shape of the plunger 1840 is not limited. For example, the contact surface of the plunger 1840 may be blunt in order to deform the container 1820 without creating another opening. In other embodiments, the shape of the plunger 1840 may be configured to deform the container 1820 and create another opening. For example, the plunger may have a protrusion (e.g., spike) or sharp edges. In some embodiments, the plunger 1840 may be configured to contact the same portion of the container 1820 or different portions of the container 1820 with each actuation cycle.

FIG. 18D illustrates the container 1820 with a side wall removed for clarity to show the state of the container 1820 throughout the different steps of the opening process. The box is unopened at step 1800, cut open along a longitudinal edge at step 1804, and cut open and further deformed at step 1806. FIGS. 18E and 18F are respective side and bottom views of the plunger 1840 deforming 1806 the container 1820 such that the opening 1830 expands to allow the contents 1850 of the container 1820 to naturally fall out.

As illustrated in FIG. 18G, in some embodiments, a container 1820 may be placed into a frame 1860 to aid and/or guide an opener 1810 in creating an opening in the container 1820. The frame 1860 may be configured to hold the container 1820 in a desired position. In some embodiments, the frame 1860 may define an index 1862 (e.g., hole, cut-out, space, opening) that a portion of an opener 1810 may fit into in order to create an opening in the container 1820 held on the frame 1860. For example, an opener 1810 may slide into index 1862 and cut an opening into a predetermined corner of the container 1820. The frame 1860 may ensure that the container 1820 is at a desired position (e.g., aligned with a corner and edge) for the opener 1810 to create an opening.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface, such as the Example interface illustrated in FIG. 5. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments disclosed herein. The computer readable medium or media can be transportable, such that the program or programs stored thereon can be loaded onto one or more different computers or other processors to implement various aspects of the embodiments disclosed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods disclosed herein need not reside on a single computer or processor, but may be distributed in a modular fashion amongst a number of different computers or processors to implement various aspects disclosed herein.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method, comprising:
   providing a flow of air to a recirculating air path by a blower coupled to the recirculating air path;
   accelerating the flow of air via a nozzle coupled to the recirculating air path between the blower and a roasting chamber coupled to the recirculating air path;
   receiving, after the accelerating, the flow of air in the roasting chamber;
   roasting coffee beans within the roasting chamber based at least in part on the flow of air received in the roasting chamber;
   outputting the flow of air from the roasting chamber after the roasting; and
   receiving, after the outputting, the flow of air at a catalytic oxidizer coupled to the recirculating air path.

2. The method of claim 1, where the accelerating includes accelerating the flow of air monotonously through a cross-sectional area of the nozzle.

3. The method of claim 1, further comprising:
   mechanically circulating the coffee beans within the roasting chamber during the roasting.

4. The method of claim 1, further comprising:
separating, via a cyclonic separator coupled to the recirculating air path, a portion of the coffee beans after the roasting and before the receiving at the catalytic oxidizer.

5. The method of claim 1, further comprising:
increasing a temperature of the flow of air via a heater coupled to the recirculating air path and before the receiving the flow of air at the catalytic oxidizer.

6. The method of claim 1, further comprising:
receiving the flow of air at a heat exchanger and from the blower, the heat exchanger coupled to the recirculating air path; and
receiving the flow of air at the heat exchanger and from the catalytic oxidizer.

7. The method of claim 1, wherein:
the nozzle defines a lumen that decreases in cross-sectional area from a proximal end of the nozzle to a distal end of the nozzle, and
the nozzle includes a curve of between 90° and 135° between the proximal end of the nozzle and the distal end of the nozzle,
the method further comprising:
outputting the flow of air from the distal end of the nozzle into the roasting chamber.

8. The method of claim 1, wherein a portion of a length of the nozzle between a proximal end of the nozzle and a distal end of the nozzle defines a curve in a direction of the portion of the length that is configured to promote an even pressure distribution of the flow of air as the flow of air is output from the nozzle.

9. The method of claim 1, wherein:
the nozzle includes a nozzle exhaust at a distal end of the nozzle configured to output the flow of air into the roasting chamber,
the nozzle defines a curve along a portion of a length of the nozzle between a proximal end of the nozzle and the distal end of the nozzle, and
the nozzle exhaust is positioned at a lower portion of the roasting chamber such that the flow of air output from the nozzle exhaust and into the roasting chamber can loft a portion of the coffee beans within the roasting chamber.

10. A method, comprising:
providing a flow of air to an air flow path by a blower coupled to the air flow path, the blower configured to pressurize ambient air;
accelerating, via a nozzle coupled to the air flow path between the blower and a roasting chamber coupled to the air flow path, at least a portion of the flow of air that is input to the roasting chamber;
receiving, at a cyclonic separator coupled to the air flow path, air that is output from the roasting chamber;
separating, at the cyclonic separator, a portion of a substance from the air;
receiving the air at a catalytic oxidizer coupled to the air flow path after the separating; and
mixing in the air flow path ambient air pressurized by the blower and heated air previously circulated through the air flow path.

11. The method of claim 10, further comprising:
increasing a temperature of the air in the air flow path via a heater coupled to the air flow path.

12. The method of claim 10, further comprising:
increasing a temperature of the air in the air flow path via a heater coupled to the air flow path,
the increasing the temperature is before the receiving the air at the catalytic oxidizer.

13. The method of claim 10, wherein a heat exchanger is coupled to the air flow path between the catalytic oxidizer and the nozzle.

14. The method of claim 10, wherein the nozzle has an internal configuration that includes (1) a decrease in cross-sectional area from a proximal end of the nozzle to a distal end of the nozzle, and (2) a curve in the nozzle of between 90° and 135° between the proximal end of the nozzle and the distal end of the nozzle, the internal configuration of the nozzle configured to produce the accelerating.

15. The method of claim 10, further comprising:
outputting air through a distal end of the nozzle to a lower portion of the roasting chamber.

16. A method, comprising:
providing air to a recirculating air path by a blower coupled to the recirculating air path;
modulating, via a non-linear portion of a nozzle coupled to the recirculating air path, an output of the air into a roasting chamber coupled to the recirculating air path such that the air is configured to loft at least a portion of coffee beans within the roasting chamber;
roasting the coffee beans within the roasting chamber, the roasting chamber configured to mechanically circulate the coffee beans within the roasting chamber during the roasting; and
circulating the air through a cyclonic separator, a heater and a catalytic oxidizer, the cyclonic separator being disposed between the roasting chamber and the heater, the heater being disposed between the cyclonic separator and the catalytic oxidizer.

17. The method of claim 16, wherein:
the non-linear portion of the nozzle is between a proximal end portion of the nozzle and a distal end portion of the nozzle, and
the distal end portion of the nozzle has a reduced cross-sectional area compared to a cross-sectional area of the proximal end portion of the nozzle.

18. The method of claim 16, further comprising:
mixing air output from the catalytic oxidizer with the air provided by the blower within the recirculating air path; and
outputting the air after the mixing to the roasting chamber via the nozzle.

19. The method of claim 16, wherein the nozzle includes a curve of between 90° and 135° between a proximal end portion of the nozzle and a distal end portion of the nozzle.

20. The method of claim 16, further comprising:
outputting the coffee beans, after the roasting, to a container for cooling.

* * * * *